US010924649B2

(12) United States Patent
Tseng et al.

(10) Patent No.: US 10,924,649 B2
(45) Date of Patent: Feb. 16, 2021

(54) PHOTOGRAPHING MODULE WITH LEAF SPRING AND ELECTRONIC DEVICE INCLUDING SAME MODULE

(71) Applicant: LARGAN DIGITAL CO., LTD., Taichung (TW)

(72) Inventors: Te-Sheng Tseng, Taichung (TW); Wen-Hung Hsu, Taichung (TW); Ming-Ta Chou, Taichung (TW)

(73) Assignee: LARGAN DIGITAL CO., LTD., Taichung (TW)

( * ) Notice: Subject to any disclaimer, the term of this patent is extended or adjusted under 35 U.S.C. 154(b) by 0 days.

(21) Appl. No.: 16/567,065

(22) Filed: Sep. 11, 2019

(65) Prior Publication Data

US 2020/0145564 A1 May 7, 2020

(30) Foreign Application Priority Data

Nov. 6, 2018 (TW) ................................. 10713936.9

(51) Int. Cl.
| | |
|---|---|
| *H04N 5/225* | (2006.01) |
| *G02B 7/09* | (2006.01) |
| *G03B 3/10* | (2006.01) |
| *G02B 13/00* | (2006.01) |
| *G02B 7/00* | (2006.01) |

(52) U.S. Cl.
CPC ............. *H04N 5/2257* (2013.01); *G02B 7/09* (2013.01); *G03B 3/10* (2013.01); *H04N 5/2253* (2013.01); *H04N 5/2254* (2013.01); *G02B 7/003* (2013.01); *G02B 13/001* (2013.01)

(58) Field of Classification Search
CPC .. H04N 5/2257; H04N 5/2253; H04N 5/2254; G02B 7/09; G02B 13/001; G02B 7/003; G03B 3/10; G03B 17/12
See application file for complete search history.

(56) References Cited

U.S. PATENT DOCUMENTS

| | | |
|---|---|---|
| 8,995,068 B2 | 3/2015 | Baik et al. |
| 9,195,026 B1 | 11/2015 | Chen et al. |
| 9,335,507 B2 | 5/2016 | Hagiwara |

(Continued)

FOREIGN PATENT DOCUMENTS

| | | |
|---|---|---|
| EP | 2824813 A1 | 1/2015 |
| TW | 201600898 A | 1/2016 |

(Continued)

*Primary Examiner* — Nhan T Tran
(74) *Attorney, Agent, or Firm* — McClure, Qualey & Rodack, LLP

(57) ABSTRACT

A photographing module includes a metal cover, a base, a lens portion and a leaf spring. The lens portion is displaceably disposed in an inner space. The leaf spring is assembled with the lens portion and includes an inner fixing portion, an outer fixing portion and an elastic portion. The inner fixing portion is assembled with the lens portion. The outer fixing portion contacts and is fixedly disposed with the metal cover. The elastic portion connects the inner fixing portion and the outer fixing portion. The leaf spring further includes a plurality of contact portions and a plurality of auxiliary elastic portions. Each of the auxiliary elastic portions connects the outer fixing portion and one of the contact portions. For the leaf spring, only the contact portions thereof contact side plates of the metal cover.

17 Claims, 26 Drawing Sheets

(56) References Cited

U.S. PATENT DOCUMENTS

| | | | |
|---|---|---|---|
| 9,720,204 B2* | 8/2017 | Yoo | G02B 27/646 |
| 9,781,322 B2 | 10/2017 | Cho et al. | |
| 2008/0259470 A1* | 10/2008 | Chung | G02B 7/08 |
| | | | 359/823 |
| 2013/0215511 A1* | 8/2013 | Wu | H04N 5/23287 |
| | | | 359/554 |
| 2015/0022891 A1* | 1/2015 | Hu | G02B 7/08 |
| | | | 359/557 |
| 2016/0018624 A1* | 1/2016 | Yeo | G03B 5/00 |
| | | | 359/557 |
| 2016/0109719 A1* | 4/2016 | Cho | G03B 5/00 |
| | | | 359/557 |
| 2016/0209621 A1* | 7/2016 | Park | G02B 7/08 |
| 2017/0099417 A1* | 4/2017 | Oh | G02B 7/08 |
| 2017/0123180 A1* | 5/2017 | Osaka | H04N 5/2254 |

FOREIGN PATENT DOCUMENTS

| | | | |
|---|---|---|---|
| WO | 2010095407 A1 | 8/2010 | |
| WO | 2018066861 A1 | 4/2018 | |
| WO | 2018173775 A1 | 9/2018 | |

\* cited by examiner

ND ELECTRONIC DEVICE
INCLUDING SAME MODULE

PHOTOGRAPHING MODULE WITH LEAF SPRING AND ELECTRONIC DEVICE INCLUDING SAME MODULE

RELATED APPLICATIONS

This application claims priority to Taiwan Application Serial Number 107139369, filed Nov. 6, 2018, which is herein incorporated by reference.

BACKGROUND

Technical Field

The present disclosure relates to a photographing module and an electronic device. More particularly, the present disclosure relates to a compact photographing module, which includes a leaf spring and is applicable to electronic devices, and an electronic device.

Description of Related Art

In general, the voice coil motor (VCM) acting as a lens driving apparatus is applied to the lens portion of the photographing module in the electronic device for providing an auto-focusing function, and a leaf spring of the photographing module is assembled on the carrier. When the leaf spring is deformed by force to provide degrees of freedom and restoring force for the carrier, the lens portion can be carried to be displaced by the carrier so as to achieve the auto-focusing function.

However, this kind of photographing module usually includes quite numerous parts. In order to meet the demands of accurate and smooth displacement of the lens portion, it is required lots of alignment and calibration steps during the assembling procedure of the photographing module so as to finish accurately assembling the photographing module from the parts one by one. Thus, it affects the cost and limits the production efficiency and the manufacturing yield rate of the photographing module.

Given the above, how to improve the manufacturing cost and the production efficiency while maintaining the assembling accuracy, achieve the fast focusing function of the photographing module, and thereby satisfy the requirements of the electronic devices in high-end imaging has become one of the important subjects related to photographing modules.

SUMMARY

According to one aspect of the present disclosure, a photographing module includes a metal cover, a base, a lens portion and a leaf spring. The metal cover includes a top plate and a plurality of side plates. The top plate has an opening. The side plates extend from the top plate along a direction away from the opening. The base is assembled with the metal cover to define an inner space. The base has a through hole, and the through hole is disposed correspondingly to the opening of the metal cover. The lens portion is displaceably disposed in the inner space. The leaf spring is assembled with the lens portion and includes an inner fixing portion, an outer fixing portion and an elastic portion. The inner fixing portion is assembled with the lens portion. The outer fixing portion contacts and is fixedly disposed with the metal cover. The elastic portion connects the inner fixing portion and the outer fixing portion. The leaf spring further includes a plurality of contact portions and a plurality of auxiliary elastic portions. Each of the auxiliary elastic portions connects the outer fixing portion and one of the contact portions. For the leaf spring, only the contact portions thereof contact the side plates of the metal cover.

According to another aspect of the present disclosure, an electronic device includes the photographing module according to the foregoing aspect and an image sensor. The image sensor is disposed on an image surface of the photographing module.

BRIEF DESCRIPTION OF THE DRAWINGS

The present disclosure can be more fully understood by reading the following detailed description of the embodiment, with reference made to the accompanying drawings as follows.

DETAILED DESCRIPTION

1st Embodiment

Figure 1A:
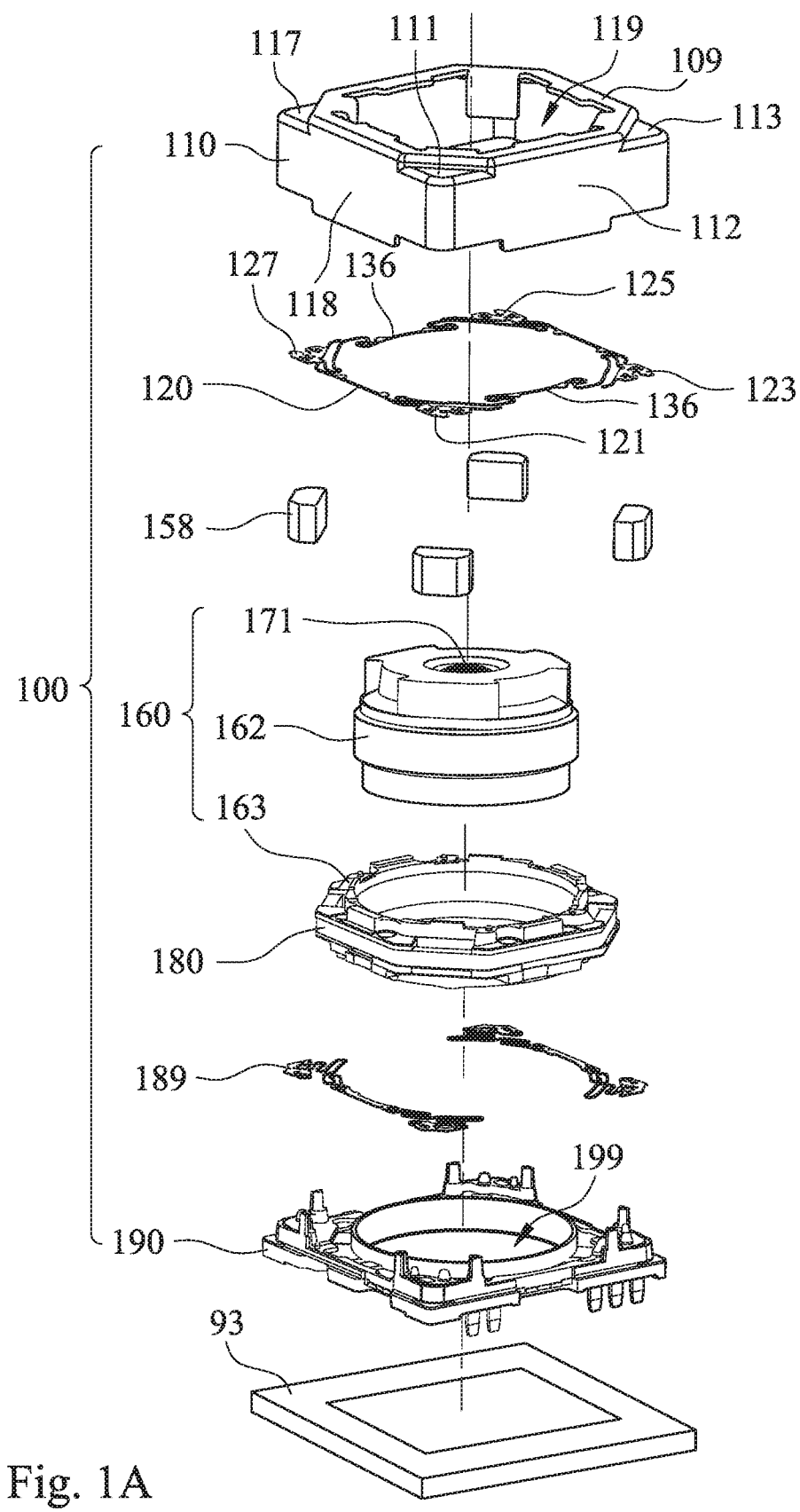
FIG. 1A is an exploded view of a photographing module according to the 1st embodiment of the present disclosure and an image sensor.
Figure 1B:
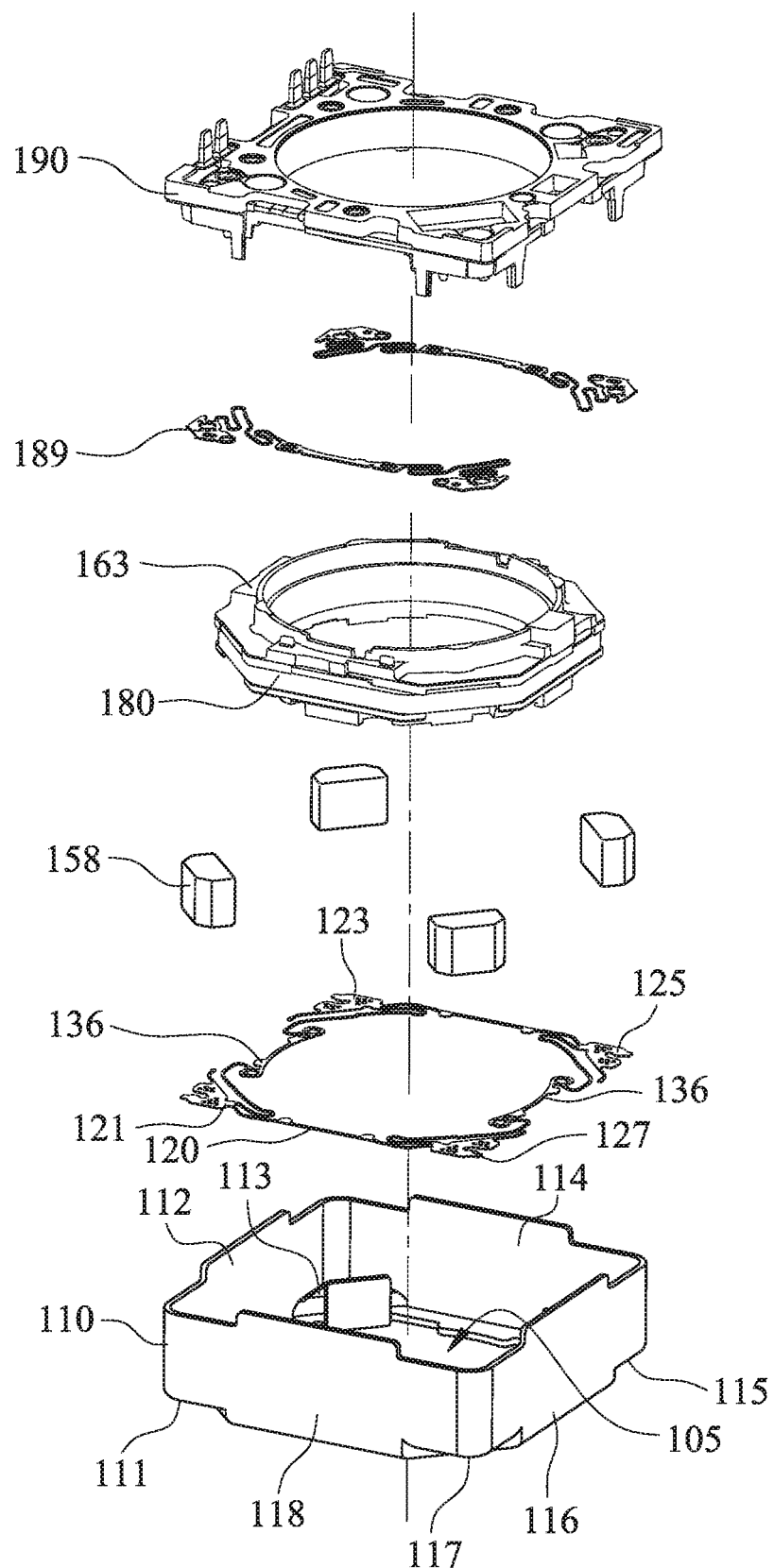
FIG. 1B is an exploded view of parts of the photographing module according to the 1st embodiment.

FIG. 1A is an exploded view of a photographing module 100 according to the 1st embodiment of the present disclosure and an image sensor 93. FIG. 1B is an exploded view of parts of the photographing module 100 according to the 1st embodiment. In FIG. 1A and FIG. 1B, the photographing module 100 includes a metal cover 110, a base 190, a lens portion 160 and a plurality of leaf springs. The leaf springs are an upper leaf spring 120 and two lower leaf springs 189. The upper leaf spring 120 and the two lower leaf springs 189 are all made of metal materials. In addition, the upper leaf spring and the lower leaf spring according to the present disclosure are the idiomatic expressions in the art. The upper leaf spring indicates a leaf spring, which is disposed on a lens portion and away from a through hole of a base (i.e. close to an object side of a photographing module). The lower leaf spring indicates another leaf spring, which is disposed on the lens portion and close to the through hole of the base (i.e. close to an image side of the photographing module). Thus, the upper leaf spring and the lower leaf spring do not indicate being disposed at an absolutely upper position and an absolutely lower position respectively.

Figure 1C:
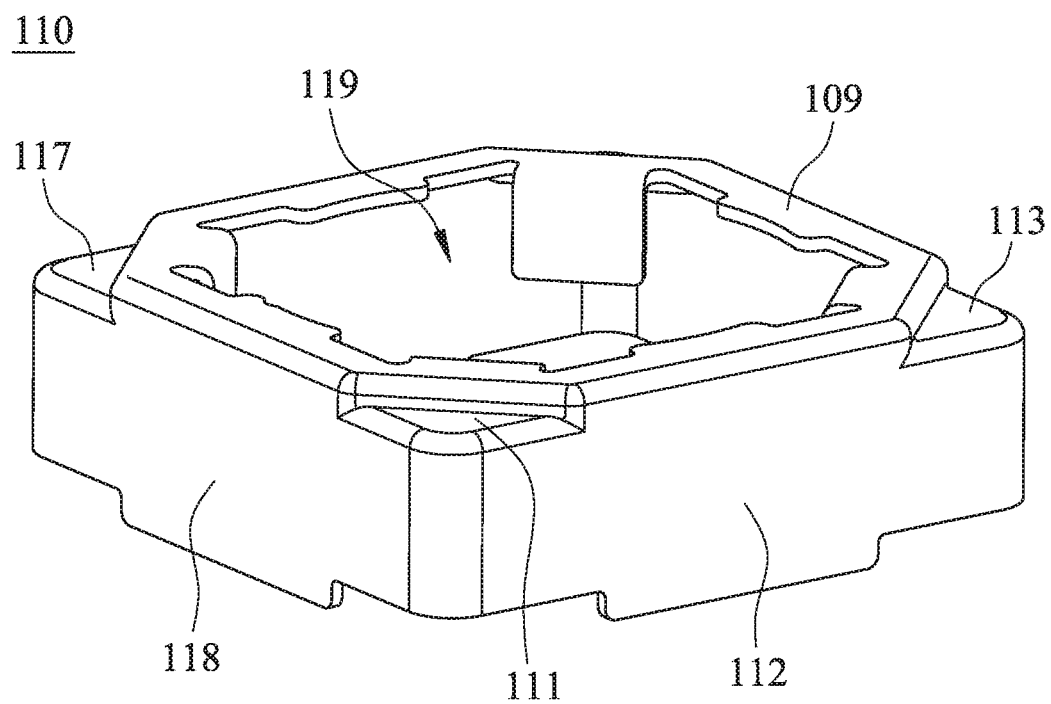
FIG. 1C is a three-dimensional view of a metal cover according to the 1st embodiment.
Figure 1D:
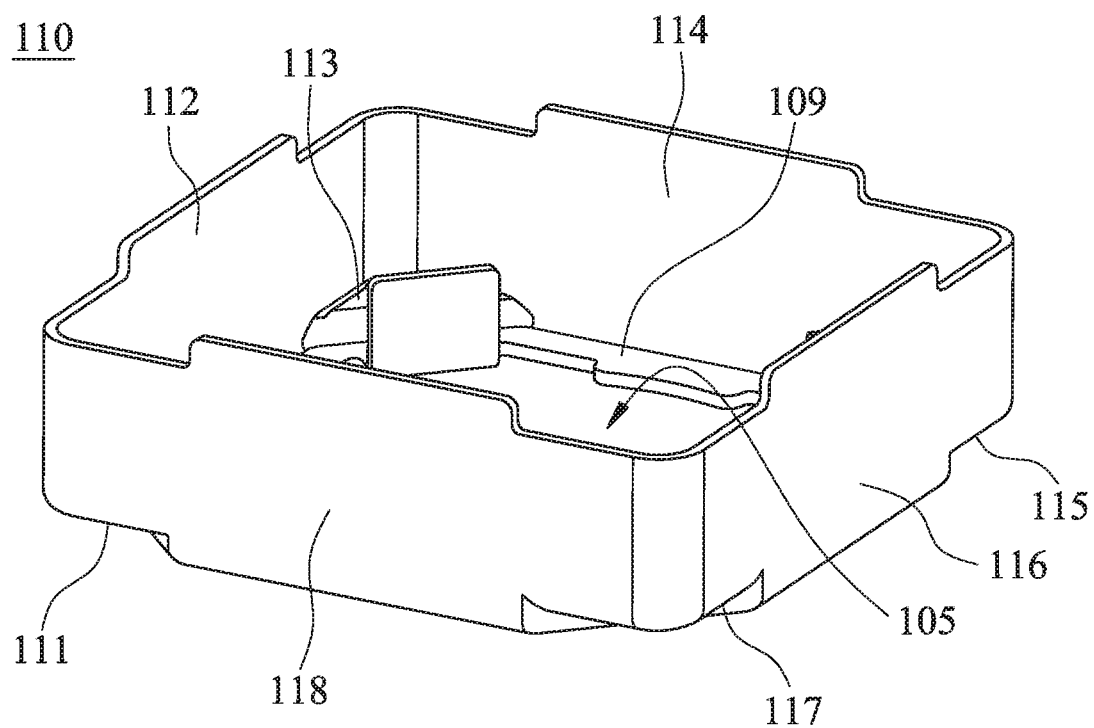
FIG. 1D is another three-dimensional view of the metal cover according to the 1st embodiment.

FIG. 1C is a three-dimensional view of the metal cover 110 according to the 1st embodiment. FIG. 1D is another three-dimensional view of the metal cover 110 according to the 1st embodiment. In FIG. 1C and FIG. 1D, the metal cover 110 includes a top plate 109 and four side plates, which are side plates 112, 114, 116 and 118. The top plate 109 has an opening 119. The side plates 112, 114, 116 and 118 extend from the top plate 109 along a direction away from the opening 119. Furthermore, the metal cover 110 may be made of a metal material overall, or made of a metal material with just a part thereof, such as being processed with a metal coating or a metal painting on a surface of a nonmetal material.

In FIG. 1A and FIG. 1B, the base 190 is assembled with the metal cover 110 to define an inner space 105. The base 190 has a through hole 199, and the through hole 199 is disposed correspondingly to the opening 119 of the metal cover 110. The lens portion 160 is displaceably disposed in the inner space 105.

Specifically, the photographing module 100 includes the metal cover 110, the upper leaf spring 120, driving magnets 158, the lens portion 160, a coil 180, the lower leaf springs 189 and the base 190. The upper leaf spring 120, the driving magnets 158, the lens portion 160, the coil 180 and the lower leaf springs 189 are disposed in the inner space 105. Furthermore, the lens portion 160 includes a lens barrel 162, a carrier 163 and a plurality of plastic lens elements 171. The plastic lens elements 171 are disposed in the lens barrel 162. The carrier 163 is assembled with the lens barrel 162. The upper leaf spring 120 and each of the lower leaf springs 189 are arranged along a direction parallel to an optical axis (its reference numeral is omitted) and connected to the carrier 163. The upper leaf spring 120 is disposed on an end surface (its reference numeral is omitted) of the carrier 163, which is away from the base 190. The lower leaf springs 189 are disposed on an end surface (its reference numeral is omitted) of the carrier 163, which is close to the base 190. Thus, the carrier 163 (i.e. together with the lens barrel 162 and the plastic lens elements 171) are carried to be displaced relative to the base 190 and the metal cover 110 along the direction parallel to the central axis by the upper leaf spring 120 and the lower leaf springs 189, so as to achieve an auto-focusing function of the photographing module 100. In addition, the coil 180 is wound around and disposed on an outer surface (its reference numeral is omitted) of the carrier 163. A number of the driving magnets 158 is four and disposed correspondingly to the coil 180.

Figure 1E:
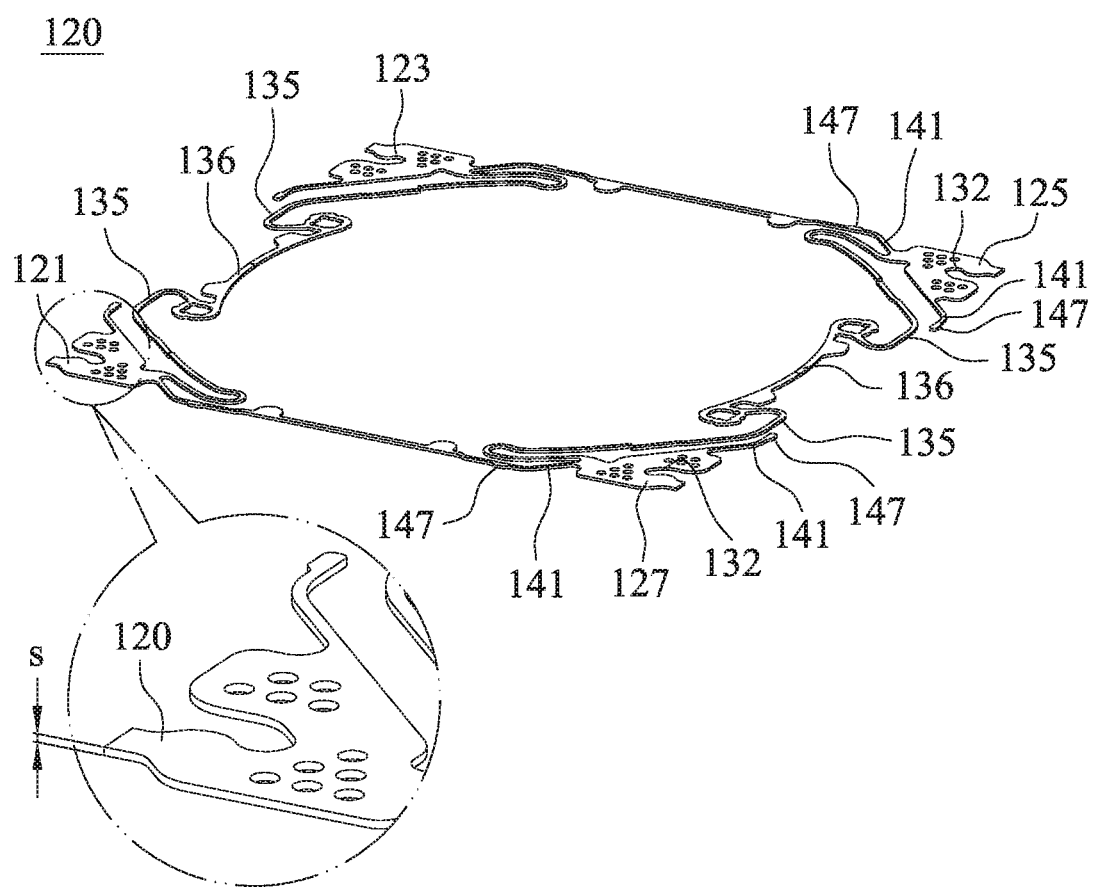
FIG. 1E is a three-dimensional view of an upper leaf spring according to the 1st embodiment.
Figure 1F:
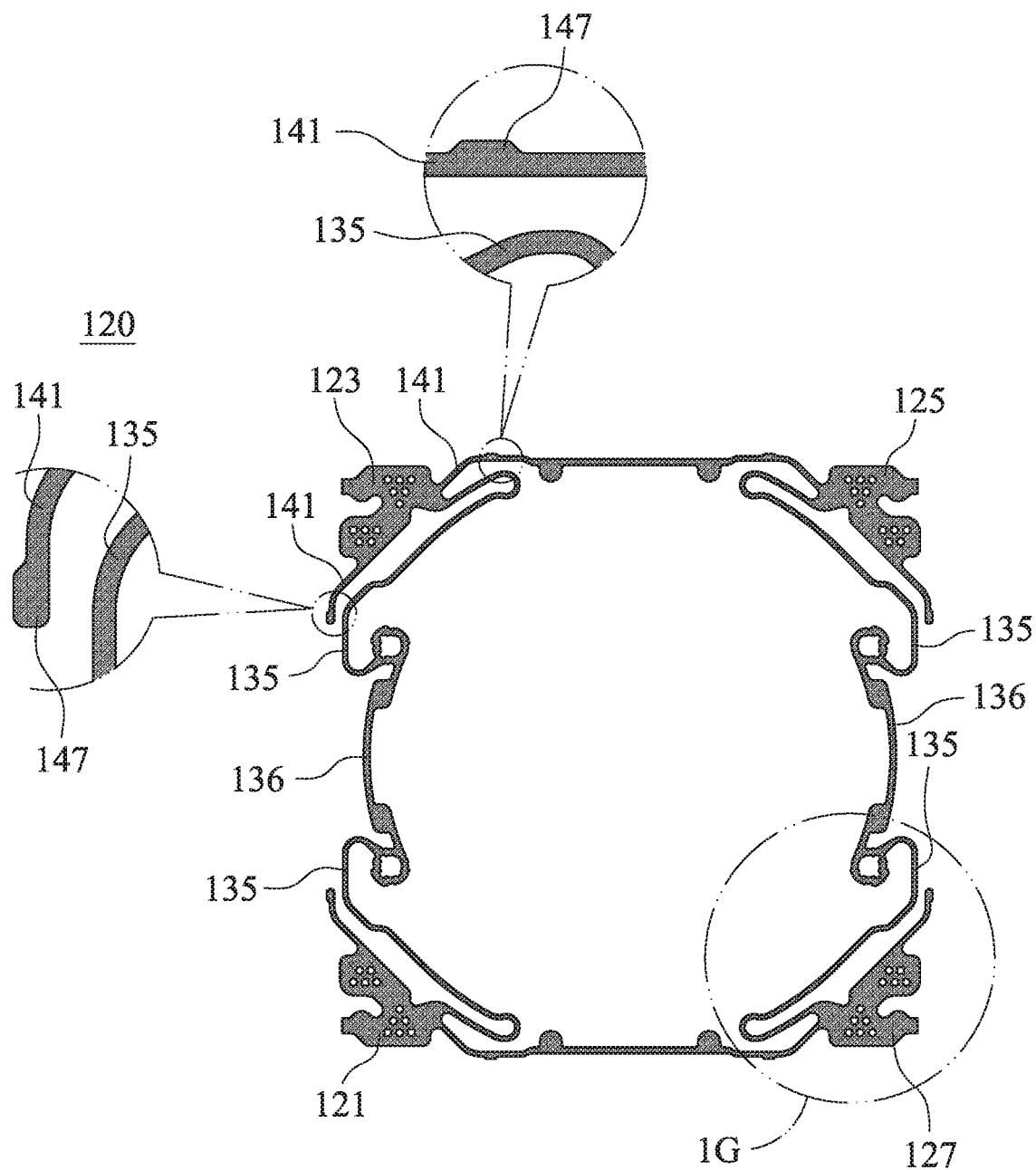
FIG. 1F is a bottom view of the upper leaf spring according to the 1st embodiment.
Figure 1G:
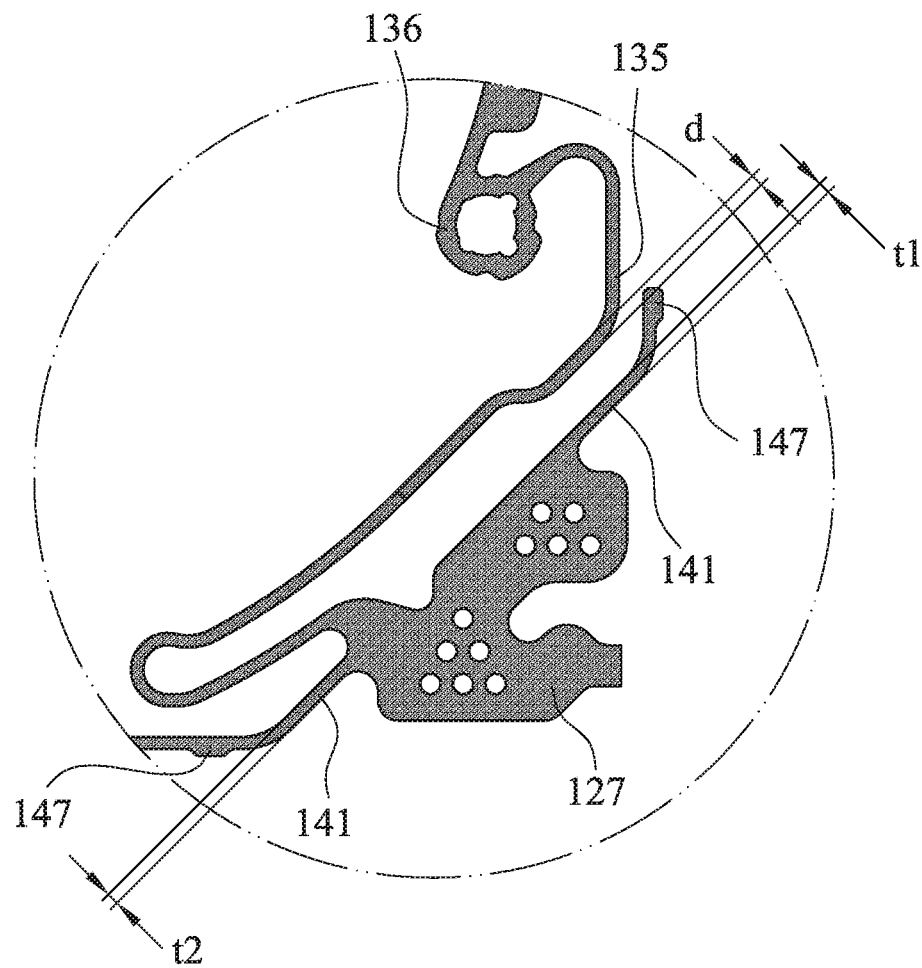
FIG. 1G is an enlarged view of part 1G in FIG. 1F.

FIG. 1E is a three-dimensional view of the upper leaf spring 120 according to the 1st embodiment. FIG. 1F is a bottom view of the upper leaf spring 120 according to the 1st embodiment. FIG. 1G is an enlarged view of part 1G in FIG. 1F. In FIG. 1E to FIG. 1G, the upper leaf spring 120 includes inner fixing portions 136, outer fixing portions 121, 123, 125, 127 and elastic portions 135. In the 1st embodiment, the upper leaf spring 120 is in a sheet shape. For the upper leaf spring 120, a number of the inner fixing portions 136 is two, a number of each of the outer fixing portions 121, 123, 125, 127 is one, and a number of the elastic portions 135 is four.

In FIG. 1A and FIG. 1B, the upper leaf spring 120 is assembled with the lens portion 160. Specifically, the upper leaf spring 120 is assembled with the carrier 163 of the lens portion 160 via the two inner fixing portions 136 of the upper leaf spring 120.

Figure 1H:
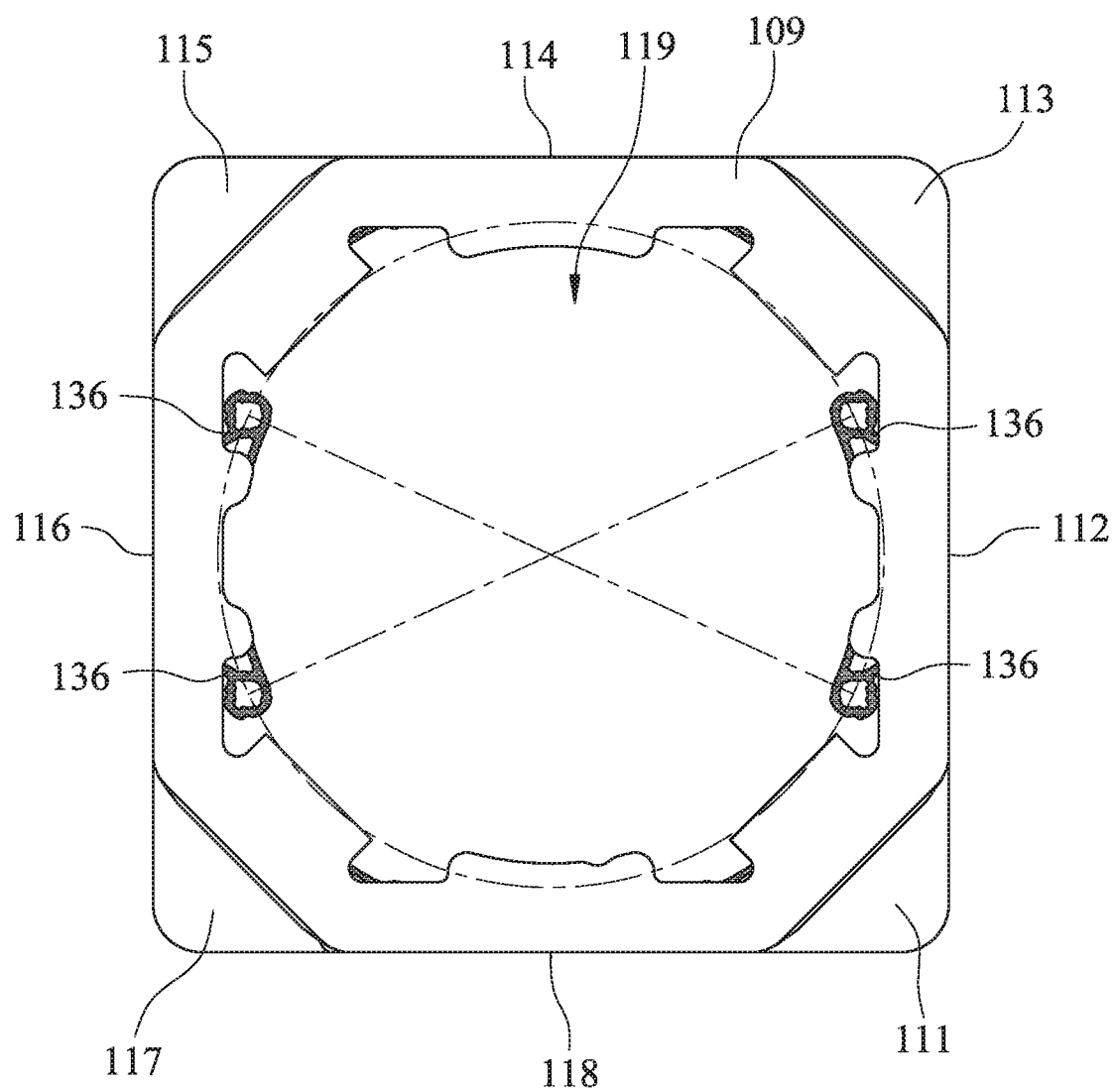
FIG. 1H is a top view of the metal cover and the upper leaf spring according to the 1st embodiment.
Figure 1I:
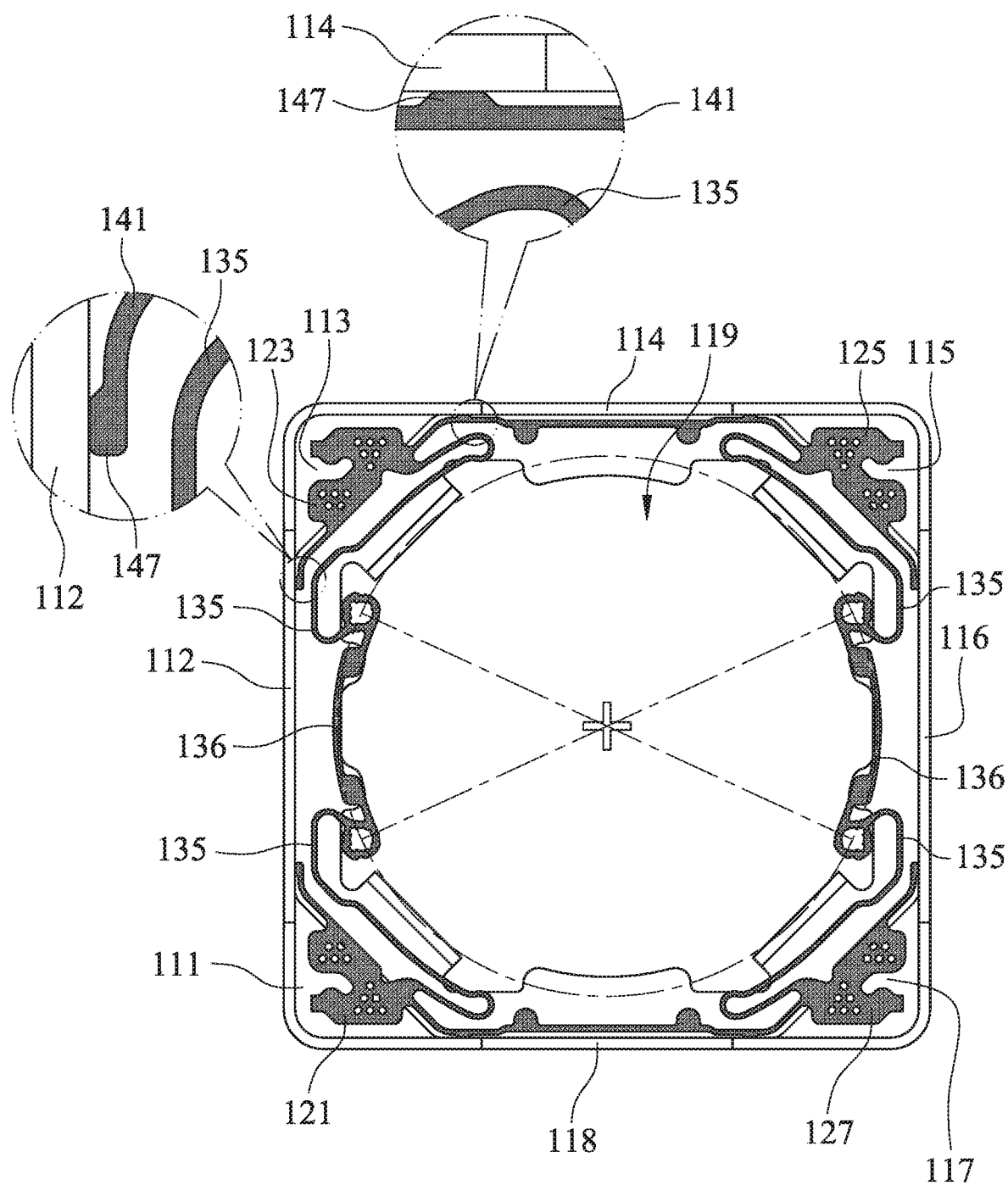
FIG. 1I is a bottom view of the metal cover and the upper leaf spring according to the 1st embodiment.
Figure 1J:
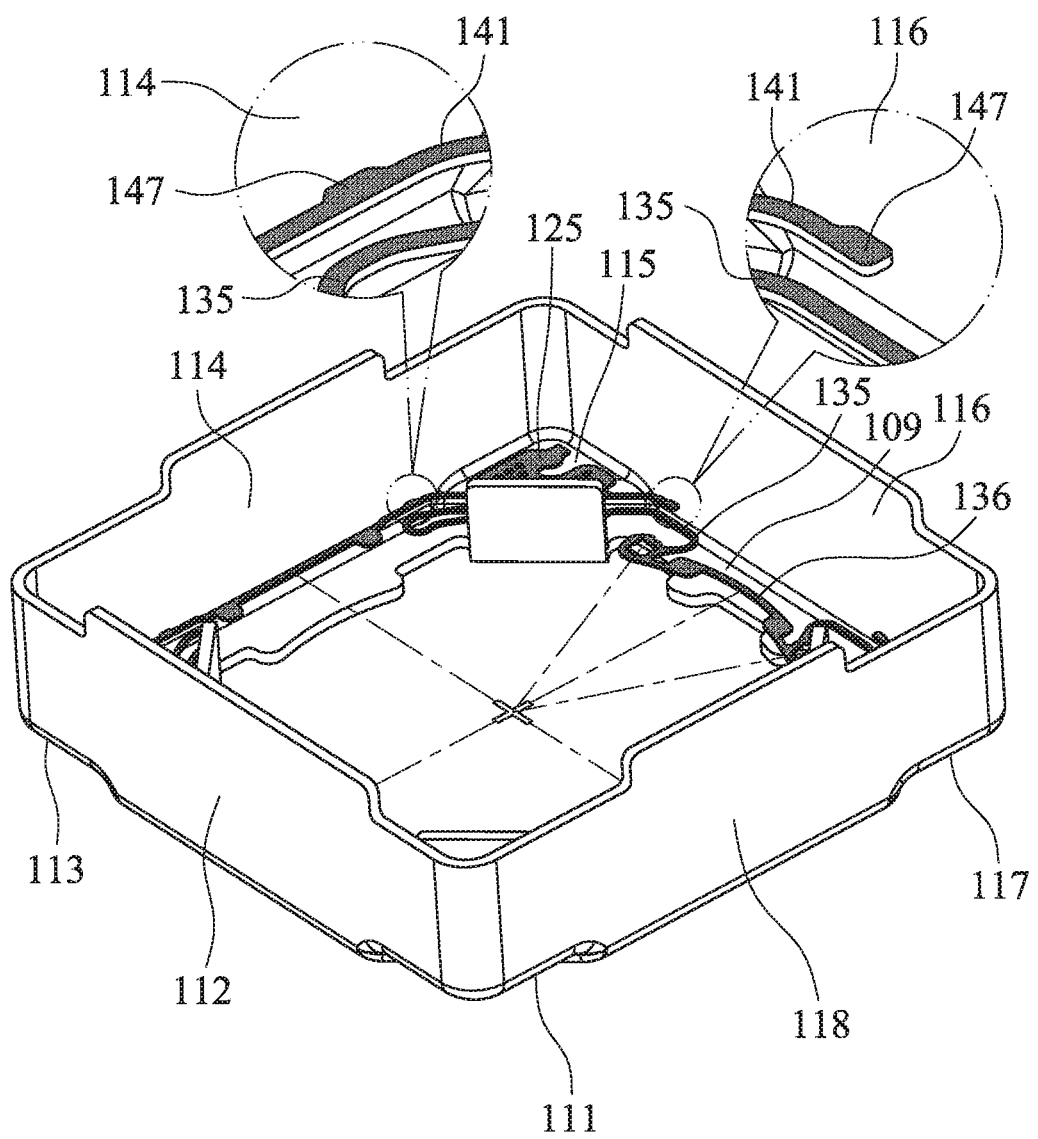
FIG. 1J is a three-dimensional view of the metal cover and the upper leaf spring according to the 1st embodiment.

FIG. 1H is a top view of the metal cover 110 and the upper leaf spring 120 according to the 1st embodiment. FIG. 1I is a bottom view of the metal cover 110 and the upper leaf spring 120 according to the 1st embodiment. FIG. 1J is a three-dimensional view of the metal cover 110 and the upper leaf spring 120 according to the 1st embodiment. In FIG. 1E to FIG. 1J, the outer fixing portions 121, 123, 125, 127 contact and are fixedly disposed with the metal cover 110. Specifically, the outer fixing portions 121, 123, 125, 127 contact and are fixedly disposed with the top plate 109 of the metal cover 110. In the 1st embodiment, one of the inner fixing portions 136 is located between the outer fixing portions 121 and 123, one of the elastic portions 135 connects the one of the inner fixing portions 136 and the outer fixing portion 121, and another of the elastic portions 135 connects the one of the inner fixing portions 136 and the outer fixing portion 123. The other one of the inner fixing portions 136 is located between the outer fixing portions 125 and 127, further another of the elastic portions 135 connects the other one of the inner fixing portions 136 and the outer fixing portion 125, and still another of the elastic portions 135 connects the other one of the inner fixing portions 136 and the outer fixing portion 127. Thus, the four elastic portions 135 connect the inner fixing portions 136 and the outer fixing portions 121, 123, 125, 127, respectively. Specifically, each of the elastic portions 135 is in a curved strip shape with a consistent width, and the four elastic portions 135 have the same widths. In other embodiment according to the present disclosure (not shown in drawings), elastic portions are for a lens portion to displace relative to a metal cover along a direction parallel to an optical axis and may not be limited in shape.

The upper leaf spring 120 further includes a plurality of contact portions 147 and a plurality of auxiliary elastic portions 141. Each of the auxiliary elastic portions 141 connects one of the outer fixing portions 121, 123, 125, 127 and one of the contact portions 147.

In FIG. 1I, for the upper leaf spring 120, only the contact portions 147 thereof contact the side plates 112, 114, 116, 118 of the metal cover 110. That is, except the contact portions 147, the upper leaf spring 120 does not contact the side plates 112, 114, 116, 118 of the metal cover 110. Comparing with a conventional photographing module, the conventional photographing module needs a frame for fixedly disposing with outer fixing portions, while the outer fixing portions being not fixedly disposed with a metal cover. In the photographing module 100 according to the present disclosure, it is favorable for decreasing assembling cost and time by omitting a frame, and thereby eliminating the assembling tolerances between the frame and other parts (e.g. the metal cover 110). Furthermore, because the outer fixing portions 121, 123, 125, 127 of the upper leaf spring 120 do not contact the side plates 112, 114, 116, 118 of the metal cover 110, it is favorable for preventing the upper leaf spring 120 from the tilt after assembling so as to reduce the assembling tolerances. When a position offset occurring between the metal cover 110 and the upper leaf spring 120, the auxiliary elastic portions 141 are advantageous in improve the problems by aligning a center of the upper leaf spring 120 with a center of the opening 119 of the metal cover 110.

Furthermore, the upper leaf spring 120 particularly includes the auxiliary elastic portions 141 to connect to the contact portions 147, and the contact portions 147 thereof contact the side plates 112, 114, 116, 118 of the metal cover 110. Thus, for the upper leaf spring 120, only the contact portions 147 thereof contact the side plates 112, 114, 116, 118 of the metal cover 110. Round angles (R angles) at corners of the metal cover 110 do not affect the flatness of the upper leaf spring 120 after assembling the metal cover 110 and the upper leaf spring 120, and thereby the tilt issues and the tolerances between the metal cover 110 and the upper leaf spring 120 can be decreased. If a position offset occurs between the center of the opening 119 of the metal cover 110 and the upper leaf spring 120 during assembling procedures, the auxiliary elastic portions 141 of the upper leaf spring 120 would provide an elastic restoring mechanism in response to the position offset of the upper leaf spring 120 so as to improve the assembling offset problems between the metal cover 110 and the upper leaf spring 120.

In FIG. 1E and FIG. 1F of the 1st embodiment, a number of each of the outer fixing portions 121, 123, 125, 127 is one. That is, a number of the outer fixing portions of the upper leaf spring 120 is four. In other embodiment according to the present disclosure (not shown in drawings), a number of outer fixing portions of an upper leaf spring may be at least two, e.g. the two outer fixing portions are located at two opposite ends of a diagonal of the rectangular appearance of the upper leaf spring. Therefore, it is favorable for enhancing the assembling stability between the outer fixing portions 121, 123, 125, 127 and the metal cover 110. Moreover, a number of upper leaf spring of a photographing module according to the present disclosure may be at least two. For example, the outer fixing portions 121 and 127 in the 1st embodiment being separated and the outer fixing portions 123 and 125 therein being separated form the two upper leaf springs. Each of the two upper leaf springs includes an inner fixing portion, an outer fixing portion, an elastic portion, a plurality of contact portions and a plurality of auxiliary elastic portions.

At least one of the outer fixing portions 121, 123, 125, 127 may be connected to at least two of the auxiliary elastic portions 141, and each of the at least two of the auxiliary elastic portions 141 is connected to one of the contact portions 147. Therefore, it is favorable for increasing the efficiency of improving the position offset problems of the upper leaf spring 120 so as to improve the position offset problems in more detailed directions of the upper leaf spring 120. Specifically, each of the auxiliary elastic portions 141 is in a straight strip shape with a consistent width or in a curved strip shape with a consistent width, and the auxiliary elastic portions 141 may have the same or different widths. In other embodiment according to the present disclosure (not shown in drawings), auxiliary elastic portions work together for improving the position offset problems of an upper leaf spring during the assembling procedures and may not be limited in shape.

In FIG. 1I and FIG. 1J of the 1st embodiment, an appearance of the top plate 109 of the metal cover 110 is in a rectangular (i.e. rectangular or square) shape with the opening 119. The upper leaf spring 120 is disposed along inner sides of the side plates 112, 114, 116, 118 to have the rectangular shape and correspondingly to the top plate 109. The outer fixing portions 121, 123, 125, 127 of the upper leaf spring 120 are disposed correspondingly to four corners, respectively, formed by the side plates 112, 114, 116, 118. That is, as shown in FIG. 1I and FIG. 1J, the outer fixing portion 121 is disposed correspondingly to the corner formed by the side plates 118 and 112, the outer fixing portion 123 is disposed correspondingly to the corner formed by the side plates 112 and 114, the outer fixing portion 125 is disposed correspondingly to the corner formed by the side plates 114 and 116, and the outer fixing portion 127 is disposed correspondingly to the corner formed by the side plates 116 and 118.

Furthermore, in FIG. 1E and FIG. 1F, each of two ends of each of the outer fixing portions 121, 123, 125, 127 is directly connected to one end of one of the auxiliary elastic portions 141, and the other end of each of the auxiliary elastic portions 141 is directly connected to one of the contact portions 147. For example, as shown in FIG. 1F, each of two ends (one end toward the side plate 112 and one end toward the side plate 114) of the outer fixing portion 123 is directly connected to one end of one of the auxiliary elastic portions 141, and the other end of each of the two auxiliary elastic portions 141 is directly connected to one of the contact portions 147. Thus, each of the auxiliary elastic portions 141 connects one of the contact portions 147 and one of the outer fixing portions 121, 123, 125, 127. A number of the auxiliary elastic portions 141 of the upper leaf spring 120 is eight, and a number of the contact portions 147 of the upper leaf spring 120 is eight.

In FIG. 1I and FIG. 1J, a number of each of the side plates 112, 114, 116, 118 in the 1st embodiment is one, that is, a number of the side plates of the metal cover 110 is four. Each of the side plates 112, 114, 116, 118 contacts two of the contact portions 147, and the upper leaf spring 120 except the eight contact portions 147 thereof does not contact the side plates 112, 114, 116, 118 of the metal cover 110. In other words, a number of side plates according to the present disclosure may be at least four, an appearance of top plate may be in a rectangular shape, a similarly rectangular shape, or a polygon shape above five sides, and each of the side plates contacts at least one of contact portions. Therefore, it is favorable for providing more elastic restoring directions by the auxiliary elastic portions 141 of the upper leaf spring 120.

In FIG. 1C, FIG. 1D, FIG. 1I and FIG. 1J, the top plate 109 may include at least two step-shaped structures, and the two step-shaped structures are located at two opposite ends of a diagonal of the rectangular appearance of the top plate 109. Specifically, the top plate 109 includes four step-shaped structures, which are step-shaped structures 111, 113, 115, 117. The step-shaped structures 111, 113, 115, 117 are respectively disposed at the four corners of the metal cover 110. For the metal cover 110, the outer fixing portions 121, 123, 125, 127 of the upper leaf spring 120 only respectively contact the step-shaped structures 111, 113, 115, 117 of the metal cover 110, and do not contact the side plates 112, 114, 116, 118 of the metal cover 110. Therefore, the outer fixing portions 121, 123, 125, 127 of the upper leaf spring 120 are advantageous in away from the opening 119 of the top plate 109 so as to reduce contact with the metal cover 110. Moreover, the step-shaped structures 111, 113, 115, 117 are beneficial to the flatness of the upper leaf spring 120 after assembling. As shown in FIG. 1D and FIG. 1J, the upper leaf spring 120 is in the sheet shape. The step-shaped structures 111, 113, 115, 117 are portions of the top plate 109 protruding toward the base 190. There are a space along the direction parallel to the optical axis between a position except the step-shaped structures 111, 113, 115, 117 of the top plate 109 and the upper leaf spring 120. That is, positions except the step-shaped structures 111, 113, 115, 117 of the top plate 109 do not contact the upper leaf spring 120.

In FIG. 1F and FIG. 1I, the eight auxiliary elastic portions 141 and the outer fixing portions 121, 123, 125, 127 of the upper leaf spring 120 may not overlap along a radial direction of the optical axis. That is, projections along the radial direction of the optical axis of the eight auxiliary elastic portions 141 and the outer fixing portions 121, 123, 125, 127 may not overlap. Therefore, it is favorable for reducing the extra volume of the upper leaf spring 120 so as to avoid compressing the volumes of the four elastic portions 135, which require softer elasticity. Specifically, each two of the eight auxiliary elastic portions 141 are connected to two ends, which are toward adjacent two side plates, of one of the outer fixing portions 121, 123, 125, 127. Furthermore, each of the four elastic portions 135 extends and curves along a portion near the optical axis of a corresponding one of the outer fixing portions 121, 123, 125, 127 to be directly connected to the corresponding one of the outer fixing portions 121, 123, 125, 127. For example, as shown in FIG. 1I, one of the four elastic portions 135 extends and curves from an end thereof toward the side plate 112 along a portion near the optical axis of the outer fixing portion 123 to the other end thereof toward the side plate 114, and thereby the one of the four elastic portions 135 is directly connected to the outer fixing portion 123. Thus, the alloy material of the upper leaf spring 120 and the structures of the elastic portions 135 are advantageous in providing appreciate elasticity of the elastic portions 135.

In FIG. 1G, when two widths respectively of the two auxiliary elastic portions 141 connected to the two ends of each of the outer fixing portions 121, 123, 125, 127 are t1 and t2 (as the outer fixing portion 127 shown in FIG. 1G), and a width of each of the elastic portions 135 is d, at least one of the following conditions may be satisfied: 0.25<t1/d<4.0; and 0.25<t2/d<4.0. Moreover, the widths t1 and t2 in the 1st embodiment are consistent with the definition of the width t in the claims of the present disclosure. If the widths of the auxiliary elastic portions 141 are overly small, the elastic portions 135 will be needlessly compressed to deform during the assembling procedures, because a partial deformation of the upper leaf spring 120 cannot be totally received by the auxiliary elastic portions 141, and thereby the elastic portions 135 follows to be additionally and needlessly compressed. If the widths of the auxiliary elastic portions 141 are overly large, the auxiliary elastic portions 141 will have permanent deformations to affect an overall flatness of the upper leaf spring 120, because the auxiliary elastic portions 141 cannot recover to be the original shapes after deformation. The photographing module 100 satisfying at least one of the aforementioned conditions is advantageous in avoiding the aforementioned problems. Further, at least one of the following conditions may be satisfied: 0.5<t1/d<2.0; and 0.5<t2/d<2.0. Therefore, the photographing module 100 satisfying at least one of the further conditions is advantageous in providing a margin for adjusting the process parameters of the manufacturing procedures, e.g. more position offset of the upper leaf spring 120 can be tolerated to speed up the assembling. In addition, a larger assembling and compressing force can be tolerated to avoid deformation so as to reduce the tilt tolerance. In FIG. 1E, a thickness of the upper leaf spring 120 is s, and the value of the thickness s is 0.03 mm.

In FIG. 1F, when a number of the contact portions 147 is N, the following condition may be satisfied: 4<N<12. Therefore, more or enough contact portions 147 are advantageous in avoiding bearing excessive and abnormal compression by a single contact portion so as to prevent the upper leaf spring 120 from more partial permanent deformation. Furthermore, the following condition may be satisfied: 6<N<10. Therefore, the upper leaf spring 120 is advantageous in evenly sharing the compression. As the aforementioned, the number of the contact portions 147 in the 1st embodiment is eight.

Figure 1K:
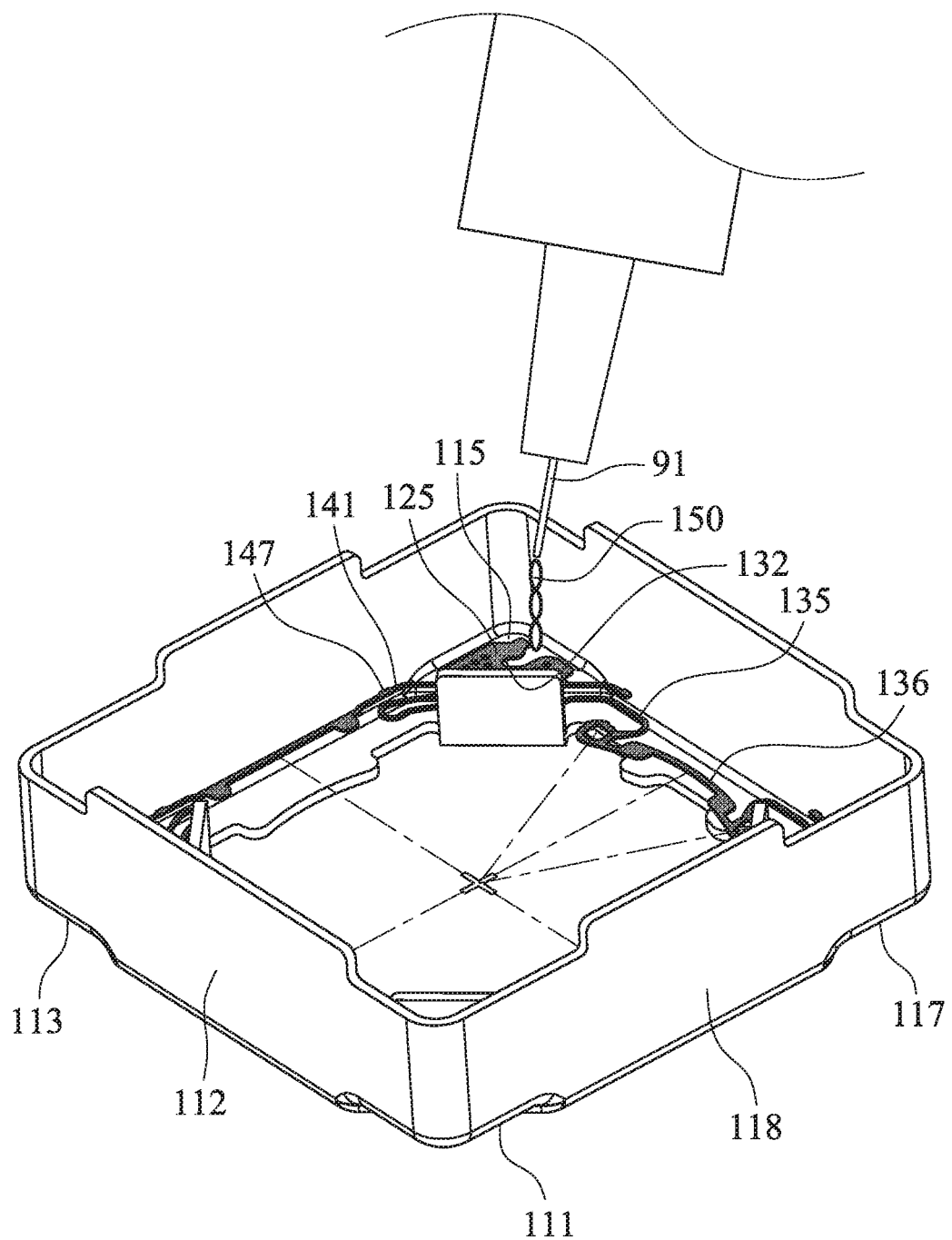
FIG. 1K is a schematic view of applying a glue material according to the 1st embodiment.

FIG. 1K is a schematic view of applying a glue material 150 according to the 1st embodiment. In FIG. 1K, the photographing module 100 may further include the glue material 150. The glue material 150 may be applied between the outer fixing portion 121 and the step-shaped structure 111, between the outer fixing portion 123 and the step-shaped structure 113, between the outer fixing portion 125 and the step-shaped structure 115, and between the outer fixing portion 127 and the step-shaped structure 117 by a needle 91. Therefore, it is favorable for increasing the quality stability after assembling so as to be unaffected by impact from collision or dropping from a high location. Moreover, the outer fixing portions 121, 123, 125, 127 may be respectively connected to the four driving magnets 158. The glue material 150 is applied and adhered among each of the four driving magnets 158, the corresponding one of the outer fixing portions 121, 123, 125, 127, and the corresponding one of the step-shaped structures 111, 113, 115, 117.

An apparent color of the glue material 150 may be opaque black. Therefore, apparent colors of the metal cover 110 and the upper leaf spring 120 are contrary metal colors, and thereby it is favorable for identifying the applying conditions of the glue material 150 to control the production quality.

In FIG. 1K, each of the outer fixing portions 121, 123, 125, 127 may include a notch structure 132 for accommodating the glue material 150. Therefore, it is favorable for accommodating more the glue material 150 to enhance the quality stability of the photographing module 100 after assembling.

The data of the aforementioned parameters of the photographing module 100 according to the 1st embodiment of the present disclosure are listed in the following Table 1, wherein the parameters are also shown as FIG. 1E and FIG. 1G.

TABLE 1

| 1st Embodiment | | | |
|---|---|---|---|
| t1 (mm) | 0.06 | t1/d | 1 |
| t2 (mm) | 0.06 | t2/d | 1 |
| d (mm) | 0.06 | s (mm) | 0.03 |

2nd Embodiment

Figure 2A:
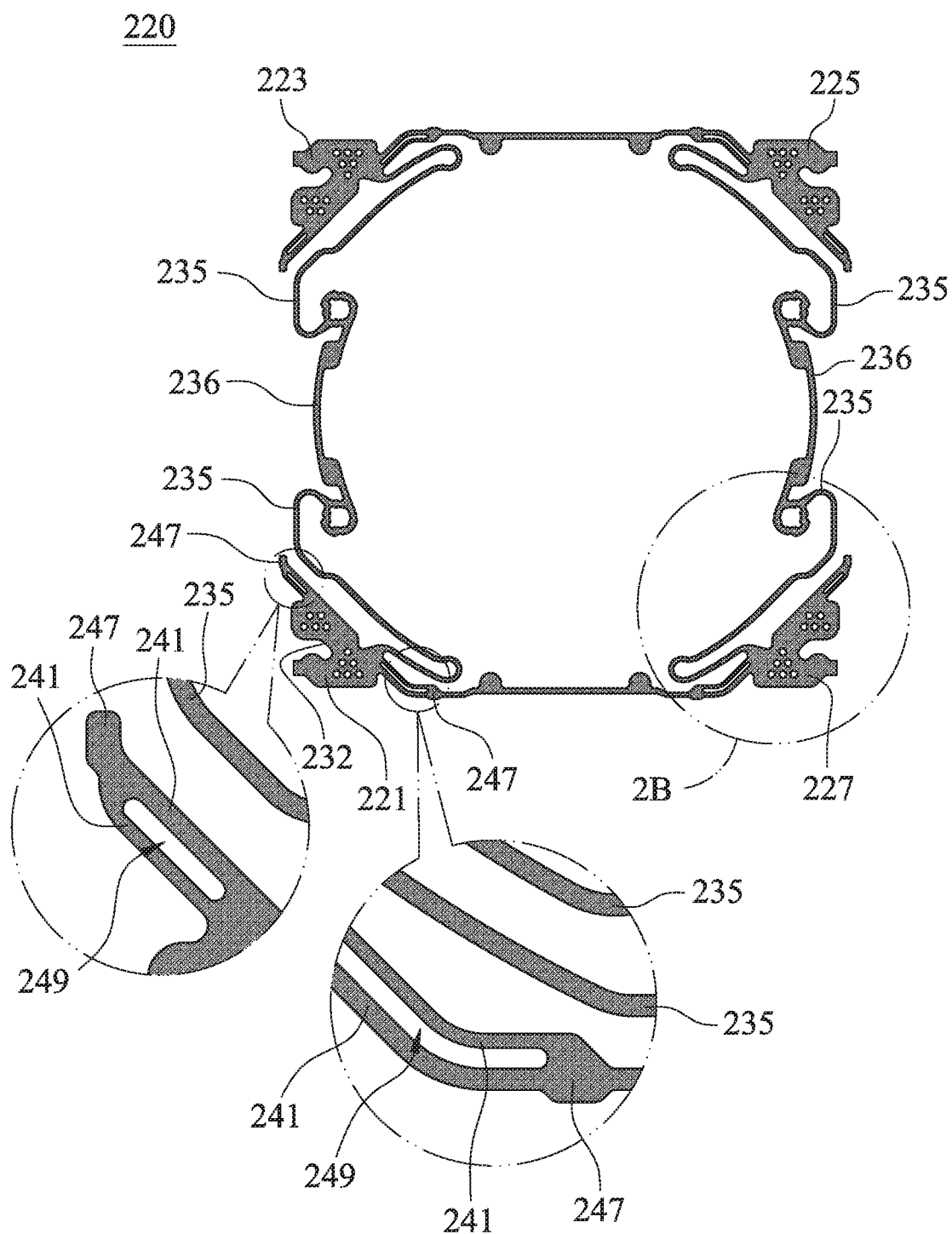
FIG. 2A is a bottom view of an upper leaf spring of a photographing module according to the 2nd embodiment of the present disclosure.
Figure 2B:
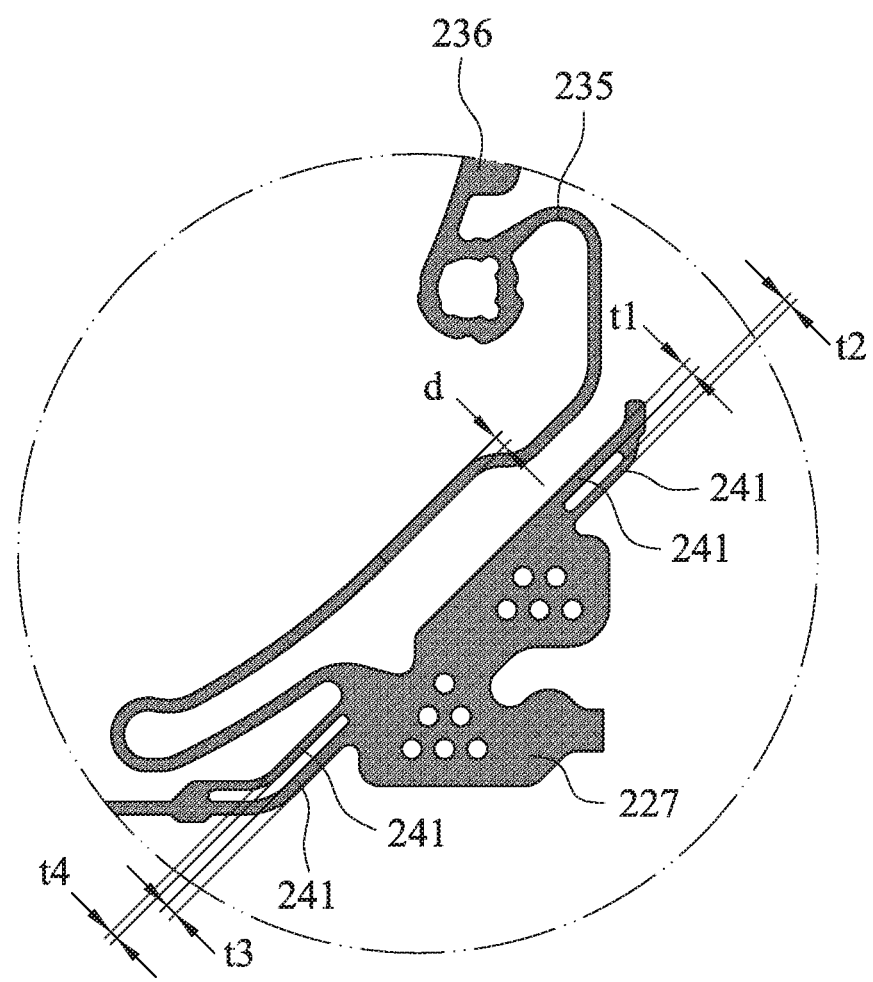
FIG. 2B is an enlarged view of part 2B in FIG. 2A.

FIG. 2A is a bottom view of an upper leaf spring 220 of a photographing module according to the 2nd embodiment of the present disclosure. FIG. 2B is an enlarged view of part 2B in FIG. 2A. In the 2nd embodiment, the photographing module includes the upper leaf spring 220, and the metal cover 110, the glue material 150, the driving magnets 158, the lens portion 160, the coil 180, the lower leaf springs 189 and the base 190 of the photographing module 100 in the aforementioned 1st embodiment. That is, the upper leaf spring is the only one difference between the photographing module in the 2nd embodiment and the photographing module 100 in the 1st embodiment. It should be realized that the upper leaf spring 220 can also be applied to other photographing modules. The other details of the photographing module 100 have been described in the foregoing paragraphs of the 1st embodiment and will not be described again herein.

In FIG. 2A and FIG. 2B, the upper leaf spring 220 includes inner fixing portions 236, outer fixing portions 221, 223, 225, 227 and elastic portions 235. In the 2nd embodiment, the upper leaf spring 220 is in a sheet shape. For the upper leaf spring 220, a number of the inner fixing portions 236 is two, a number of each of the outer fixing portions 221, 223, 225, 227 is one, and a number of the elastic portions 235 is four. The upper leaf spring 220 is assembled with the carrier 163 of the lens portion 160 via the two inner fixing portions 236 of the upper leaf spring 220. The outer fixing portions 221, 223, 225, 227 contact and are fixedly disposed with the top plate 109 of the metal cover 110.

In the 2nd embodiment, one of the inner fixing portions 236 is located between the outer fixing portions 221 and 223, one of the elastic portions 235 connects the one of the inner fixing portions 236 and the outer fixing portion 221, and another of the elastic portions 235 connects the one of the inner fixing portions 236 and the outer fixing portion 223. The other one of the inner fixing portions 236 is located between the outer fixing portions 225 and 227, further another of the elastic portions 235 connects the other one of the inner fixing portions 236 and the outer fixing portion 225, and still another of the elastic portions 235 connects the other one of the inner fixing portions 236 and the outer fixing portion 227. Thus, the four elastic portions 235 connect the inner fixing portions 236 and the outer fixing portions 221, 223, 225, 227, respectively. Specifically, each of the elastic portions 235 is in a curved strip shape with a consistent width, and the four elastic portions 235 have the same widths.

The upper leaf spring 220 further includes a plurality of contact portions 247 and a plurality of auxiliary elastic portions 241. Each of the auxiliary elastic portions 241 connects one of the outer fixing portions 221, 223, 225, 227 and one of the contact portions 247. For the upper leaf spring 220, only the contact portions 247 thereof contact the side plates 112, 114, 116, 118 of the metal cover 110. Specifically, each of the auxiliary elastic portions 241 is in a straight strip shape with a consistent width or in a curved strip shape with a consistent width.

In the 2nd embodiment, the appearance of the top plate 109 of the metal cover 110 is in the rectangular shape with the opening 119. The upper leaf spring 220 is disposed along the inner sides of the side plates 112, 114, 116, 118 to have the rectangular shape and correspondingly to the top plate 109. The outer fixing portions 221, 223, 225, 227 of the upper leaf spring 220 are disposed correspondingly to the four corners, respectively, formed by the side plates 112, 114, 116, 118.

A spacing structure 249 is located between two of the auxiliary elastic portions 241. That is, the spacing structure 249 and the two of the auxiliary elastic portions 241 overlap along a radial direction of an optical axis, i.e. projections along the radial direction of the optical axis of each of the spacing structures 249 and the corresponding two of the auxiliary elastic portions 241 overlap. Therefore, the auxiliary elastic portions 241 are advantageous in having better elasticity resulted from the metal properties thereof and the double elastic constant based on the principals similar to parallel connection of the spring.

Specifically, each of two ends of each of the outer fixing portions 221, 223, 225, 227 is directly connected to one end of the corresponding two auxiliary elastic portions 241 (the spacing structure 249 being located between the corresponding two auxiliary elastic portions 241). That is, each of the four outer fixing portions 221, 223, 225, 227 is corresponding to four of the auxiliary elastic portions 241. The other end of each of the auxiliary elastic portions 241 (i.e. the other end of the corresponding two auxiliary elastic portions 241) is directly connected to one of the contact portions 247. For example, as shown in FIG. 2A, each of two ends (one end toward the outer fixing portion 227 or the side plate 118, and one end toward the outer fixing portion 223 or the side plate 112) of the outer fixing portion 221 is directly connected to one end of the corresponding two auxiliary elastic portions 241. The other end of the corresponding two auxiliary elastic portions 241, which have the same one end to be connected to the outer fixing portion 221, is directly connected to one of the contact portions 247. Thus, a number of the auxiliary elastic portions 241 of the upper leaf spring 220 is sixteen, and a number of the contact portions 247 of the upper leaf spring 220 is eight.

In the 2nd embodiment, each of the side plates 112, 114, 116, 118 contacts two of the contact portions 247, and the upper leaf spring 220 except the eight contact portions 247 thereof does not contact the side plates 112, 114, 116, 118 of the metal cover 110. For the metal cover 110, the outer fixing portions 221, 223, 225, 227 of the upper leaf spring 220 only respectively contact the step-shaped structures 111, 113, 115, 117 of the metal cover 110, and do not contact the side plates 112, 114, 116, 118 of the metal cover 110.

The sixteen auxiliary elastic portions 241 and the outer fixing portions 221, 223, 225, 227 of the upper leaf spring 220 do not overlap along a radial direction of the optical axis. Specifically, each four of the sixteen auxiliary elastic portions 241 are connected to two ends, which are toward adjacent two side plates, of one of the outer fixing portions 221, 223, 225, 227. Furthermore, each of the four elastic portions 235 extends and curves along a portion near the optical axis of a corresponding one of the outer fixing portions 221, 223, 225, 227 to be directly connected to the corresponding one of the outer fixing portions 221, 223, 225, 227. For example, as shown in FIG. 2A, one of the four elastic portions 235 extends and curves from an end thereof toward the side plate 112 (or the outer fixing portion 223) along a portion near the optical axis of the outer fixing portion 221 to the other end thereof toward the side plate 118 (or the outer fixing portion 227), and thereby the one of the four elastic portions 235 is directly connected to the outer fixing portion 221.

In FIG. 2B, when four widths respectively of the four auxiliary elastic portions 241 connected to the two ends of each of the outer fixing portions 221, 223, 225, 227 are t1, t2, t3 and t4 (as the outer fixing portion 227 shown in FIG. 2B), and a width of each of the elastic portions 235 is d, at least one of the following conditions is satisfied: 0.25<t1/d<4.0; 0.25<t2/d<4.0; 0.25<t3/d<4.0; and 0.25<t4/d<4.0. Moreover, the widths t1, t2, t3 and t4 in the 2nd embodiment are consistent with the definition of the width t in the claims of the present disclosure. Further, at least one of the following conditions is satisfied: 0.5<t1/d<2.0; 0.5<t2/d<2.0; 0.5<t3/d<2.0; and 0.5<t4/d<2.0.

The glue material 150 in the 2nd embodiment is applied between the outer fixing portion 221 and the step-shaped structure 111, between the outer fixing portion 223 and the step-shaped structure 113, between the outer fixing portion 225 and the step-shaped structure 115, and between the outer fixing portion 227 and the step-shaped structure 117. The apparent color of the glue material 150 is opaque black. Each of the outer fixing portions 221, 223, 225, 227 includes a notch structure 232 for accommodating the glue material 150.

The data of the parameters of the photographing module according to the 2nd embodiment of the present disclosure are listed in the following Table 2, wherein the parameters are also shown as FIG. 2B. The definitions of these parameters shown in Table 2 are the same as those stated in the 1st embodiment with corresponding values in the 2nd embodiment.

TABLE 2

| 2nd Embodiment | | | |
|---|---|---|---|
| t1 (mm) | 0.06 | t1/d | 1 |
| t2 (mm) | 0.04 | t2/d | 0.67 |
| t3 (mm) | 0.06 | t3/d | 1 |
| t4 (mm) | 0.04 | t4/d | 0.67 |
| d (mm) | 0.06 | s (mm) | 0.03 |

3rd Embodiment

Figure 3A:
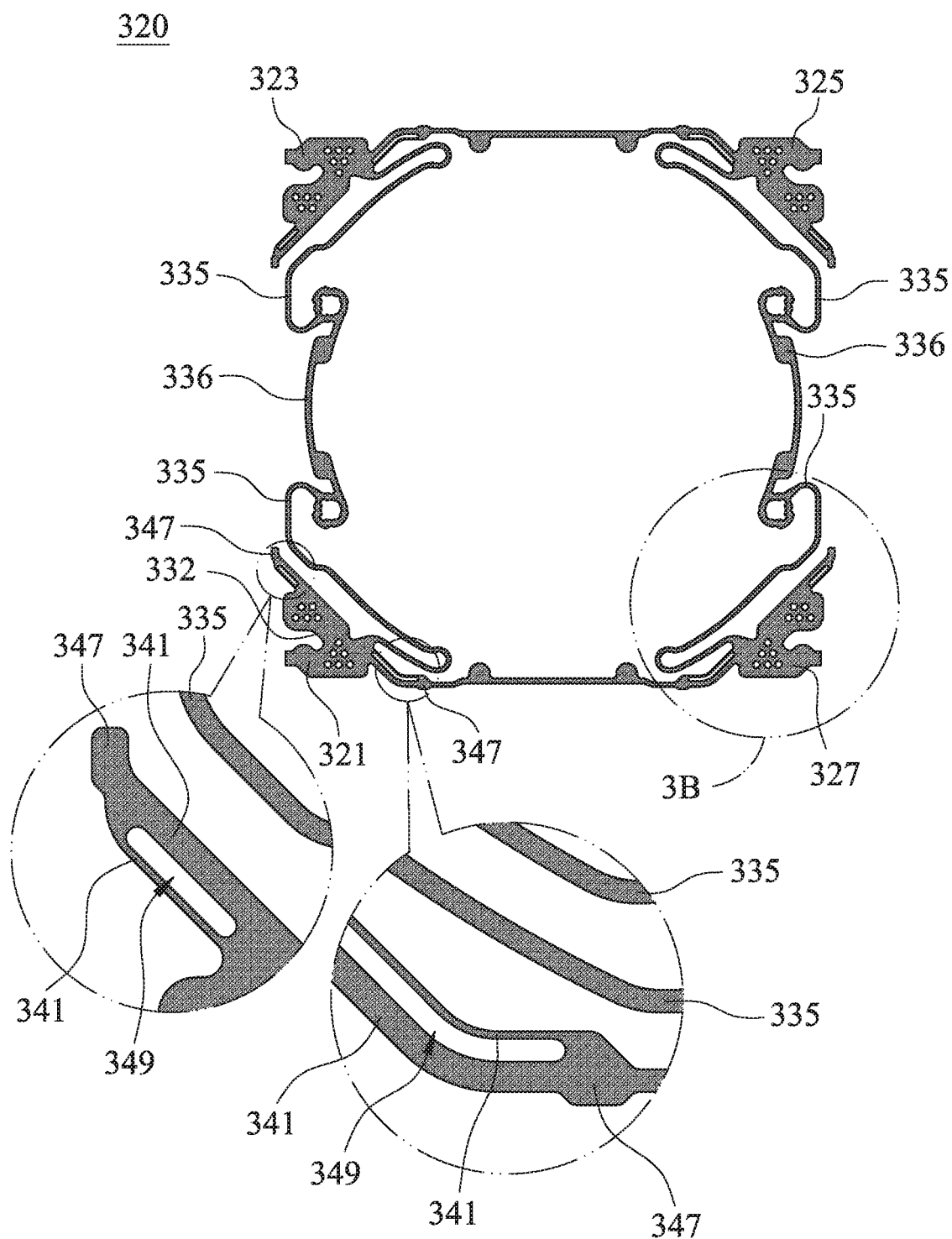
FIG. 3A is a bottom view of an upper leaf spring of a photographing module according to the 3rd embodiment of the present disclosure.
Figure 3B:
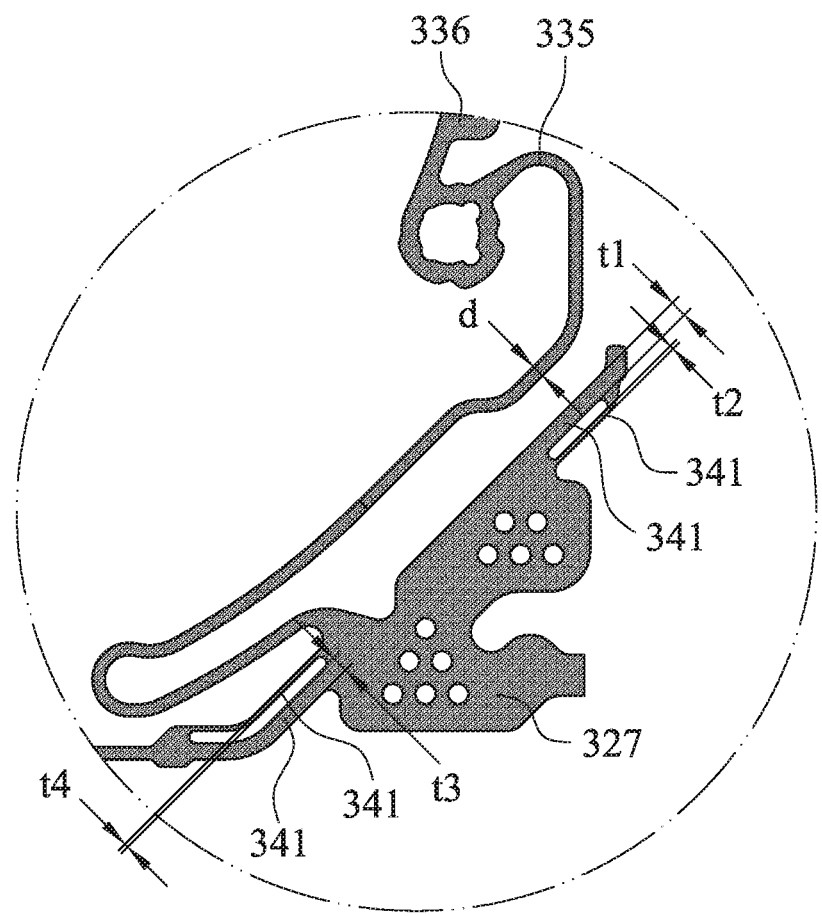
FIG. 3B is an enlarged view of part 3B in FIG. 3A.

FIG. 3A is a bottom view of an upper leaf spring 320 of a photographing module according to the 3rd embodiment of the present disclosure. FIG. 3B is an enlarged view of part 3B in FIG. 3A. In the 3rd embodiment, the photographing module includes the upper leaf spring 320, and the metal cover 110, the glue material 150, the driving magnets 158, the lens portion 160, the coil 180, the lower leaf springs 189 and the base 190 of the photographing module 100 in the aforementioned 1st embodiment. That is, the upper leaf spring is the only one difference between the photographing module in the 3rd embodiment and the photographing module 100 in the 1st embodiment. It should be realized that the upper leaf spring 320 can also be applied to other photographing modules. The other details of the photographing module 100 have been described in the foregoing paragraphs of the 1st embodiment and will not be described again herein.

In FIG. 3A and FIG. 3B, the upper leaf spring 320 includes inner fixing portions 336, outer fixing portions 321, 323, 325, 327 and elastic portions 335. In the 3rd embodiment, the upper leaf spring 320 is in a sheet shape. For the upper leaf spring 320, a number of the inner fixing portions 336 is two, a number of each of the outer fixing portions 321, 323, 325, 327 is one, and a number of the elastic portions 335 is four. The upper leaf spring 320 is assembled with the carrier 163 of the lens portion 160 via the two inner fixing portions 336 of the upper leaf spring 320. The outer fixing portions 321, 323, 325, 327 contact and are fixedly disposed with the top plate 109 of the metal cover 110.

In the 3rd embodiment, one of the inner fixing portions 336 is located between the outer fixing portions 321 and 323, one of the elastic portions 335 connects the one of the inner fixing portions 336 and the outer fixing portion 321, and another of the elastic portions 335 connects the one of the inner fixing portions 336 and the outer fixing portion 323. The other one of the inner fixing portions 336 is located between the outer fixing portions 325 and 327, further another of the elastic portions 335 connects the other one of the inner fixing portions 336 and the outer fixing portion 325, and still another of the elastic portions 335 connects the other one of the inner fixing portions 336 and the outer fixing portion 327. Thus, the four elastic portions 335 connect the inner fixing portions 336 and the outer fixing portions 321, 323, 325, 327, respectively. Specifically, each of the elastic portions 335 is in a curved strip shape with a consistent width, and the four elastic portions 335 have the same widths.

The upper leaf spring 320 further includes a plurality of contact portions 347 and a plurality of auxiliary elastic portions 341. Each of the auxiliary elastic portions 341 connects one of the outer fixing portions 321, 323, 325, 327 and one of the contact portions 347. For the upper leaf spring 320, only the contact portions 347 thereof contact the side plates 112, 114, 116, 118 of the metal cover 110. Specifically, each of the auxiliary elastic portions 341 is in a straight strip shape with a consistent width or in a curved strip shape with a consistent width.

In the 3rd embodiment, the appearance of the top plate 109 of the metal cover 110 is in the rectangular shape with the opening 119. The upper leaf spring 320 is disposed along the inner sides of the side plates 112, 114, 116, 118 to have the rectangular shape and correspondingly to the top plate 109. The outer fixing portions 321, 323, 325, 327 of the upper leaf spring 320 are disposed correspondingly to the four corners, respectively, formed by the side plates 112, 114, 116, 118.

A spacing structure 349 is located between two of the auxiliary elastic portions 341. That is, the spacing structure 349 and the two of the auxiliary elastic portions 341 overlap along a radial direction of an optical axis. Specifically, each of two ends of each of the outer fixing portions 321, 323, 325, 327 is directly connected to one end of the corresponding two auxiliary elastic portions 341 (the spacing structure 349 being located between the corresponding two auxiliary elastic portions 341). That is, each of the four outer fixing portions 321, 323, 325, 327 is corresponding to four of the auxiliary elastic portions 341. The other end of each of the auxiliary elastic portions 341 (i.e. the other end of the corresponding two auxiliary elastic portions 341) is directly connected to one of the contact portions 347. For example, as shown in FIG. 3A, each of two ends (one end toward the outer fixing portion 327 or the side plate 118, and one end toward the outer fixing portion 323 or the side plate 112) of the outer fixing portion 321 is directly connected to one end of the corresponding two auxiliary elastic portions 341. The other end of the corresponding two auxiliary elastic portions 341, which have the same one end to be connected to the outer fixing portion 321, is directly connected to one of the contact portions 347. Thus, a number of the auxiliary elastic portions 341 of the upper leaf spring 320 is sixteen, and a number of the contact portions 347 of the upper leaf spring 320 is eight.

In the 3rd embodiment, each of the side plates 112, 114, 116, 118 contacts two of the contact portions 347, and the upper leaf spring 320 except the eight contact portions 347 thereof does not contact the side plates 112, 114, 116, 118 of the metal cover 110. For the metal cover 110, the outer fixing portions 321, 323, 325, 327 of the upper leaf spring 320 only respectively contact the step-shaped structures 111, 113, 115, 117 of the metal cover 110, and do not contact the side plates 112, 114, 116, 118 of the metal cover 110.

The sixteen auxiliary elastic portions 341 and the outer fixing portions 321, 323, 325, 327 of the upper leaf spring 320 do not overlap along a radial direction of the optical axis. Specifically, each four of the sixteen auxiliary elastic portions 341 are connected to two ends, which are toward adjacent two side plates, of one of the outer fixing portions 321, 323, 325, 327. Furthermore, each of the four elastic portions 335 extends and curves along a portion near the optical axis of a corresponding one of the outer fixing portions 321, 323, 325, 327 to be directly connected to the corresponding one of the outer fixing portions 321, 323, 325, 327. For example, as shown in FIG. 3A, one of the four elastic portions 335 extends and curves from an end thereof toward the side plate 112 (or the outer fixing portion 323) along a portion near the optical axis of the outer fixing portion 321 to the other end thereof toward the side plate 118 (or the outer fixing portion 327), and thereby the one of the four elastic portions 335 is directly connected to the outer fixing portion 321.

In FIG. 3B, a thickness s of the upper leaf spring 320 is 0.03 mm, and each of widths t2 and t4 respectively of two the auxiliary elastic portions 341 is 0.02 mm. That is, the thickness s of the upper leaf spring 320 is greater than the widths t2 and t4 respectively of the two the auxiliary elastic portions 341. Therefore, the auxiliary elastic portions 341 being thinner are advantageous in designing more auxiliary elastic portions 341 in a limited space for increasing the detailed directions of buffering the assembling force, so as to reduce the abnormal bounces of the upper leaf spring 320 after being released by the assembling force.

The glue material 150 in the 3rd embodiment is applied between the outer fixing portion 321 and the step-shaped structure 111, between the outer fixing portion 323 and the step-shaped structure 113, between the outer fixing portion 325 and the step-shaped structure 115, and between the outer fixing portion 327 and the step-shaped structure 117. The apparent color of the glue material 150 is opaque black. Each of the outer fixing portions 321, 323, 325, 327 includes a notch structure 332 for accommodating the glue material 150.

The data of the parameters of the photographing module according to the 3rd embodiment of the present disclosure are listed in the following Table 3, wherein the parameters are also shown as FIG. 3B. The definitions of these parameters shown in Table 3 are the same as those stated in the 1st embodiment with corresponding values in the 3rd embodiment.

TABLE 3

| 3rd Embodiment | | | |
|---|---|---|---|
| t1 (mm) | 0.08 | t1/d | 1.33 |
| t2 (mm) | 0.02 | t2/d | 0.33 |
| t3 (mm) | 0.08 | t3/d | 1.33 |
| t4 (mm) | 0.02 | t4/d | 0.33 |
| d (mm) | 0.06 | s (mm) | 0.03 |

4th Embodiment

Figure 4A:
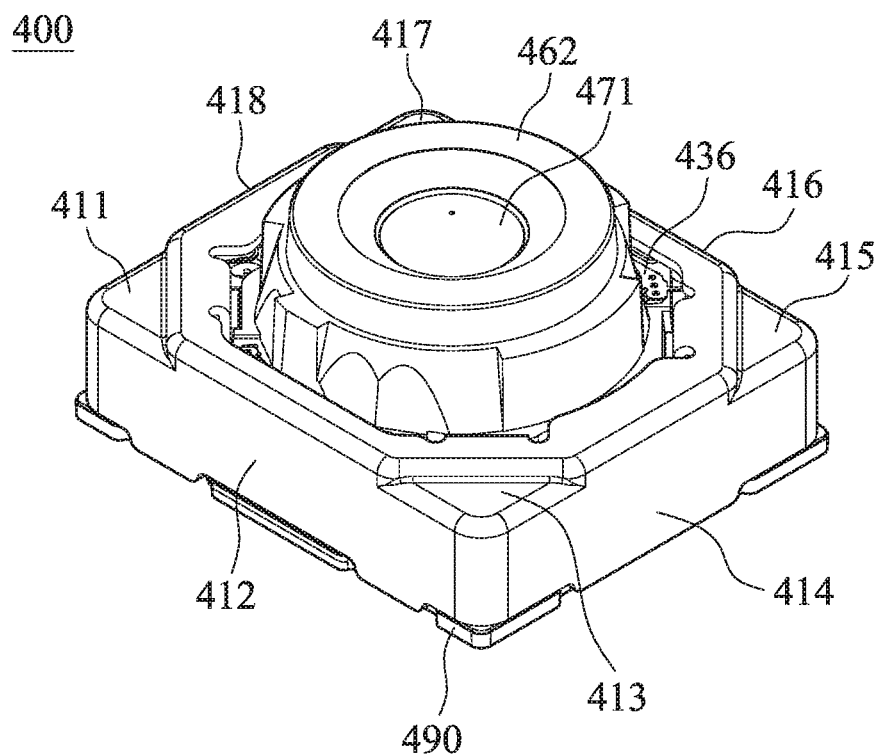
FIG. 4A is a three-dimensional view of a photographing module according to the 4th embodiment of the present disclosure.
Figure 4B:
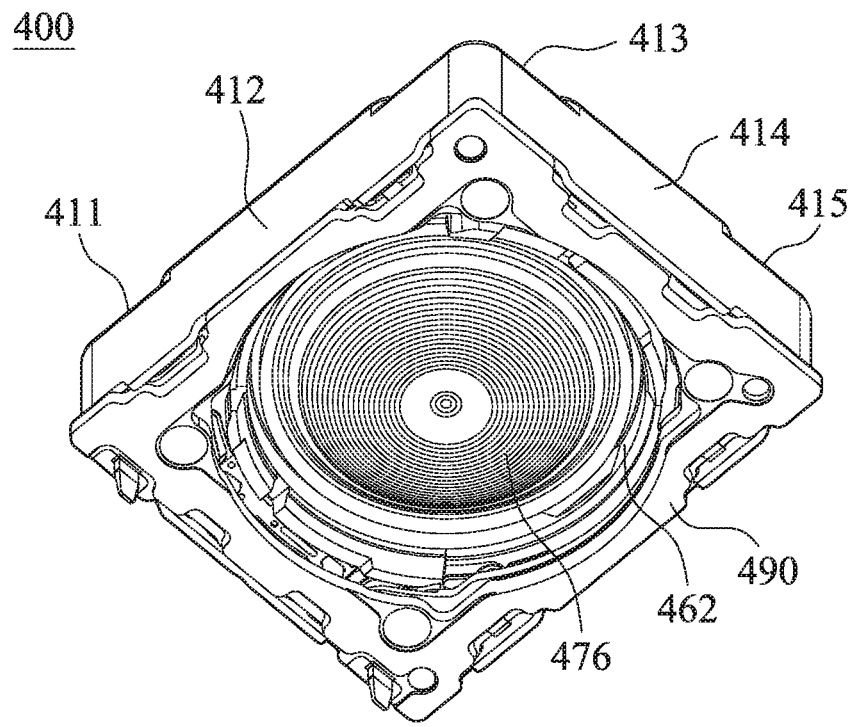
FIG. 4B is another three-dimensional view of the photographing module according to the 4th embodiment.
Figure 4C:
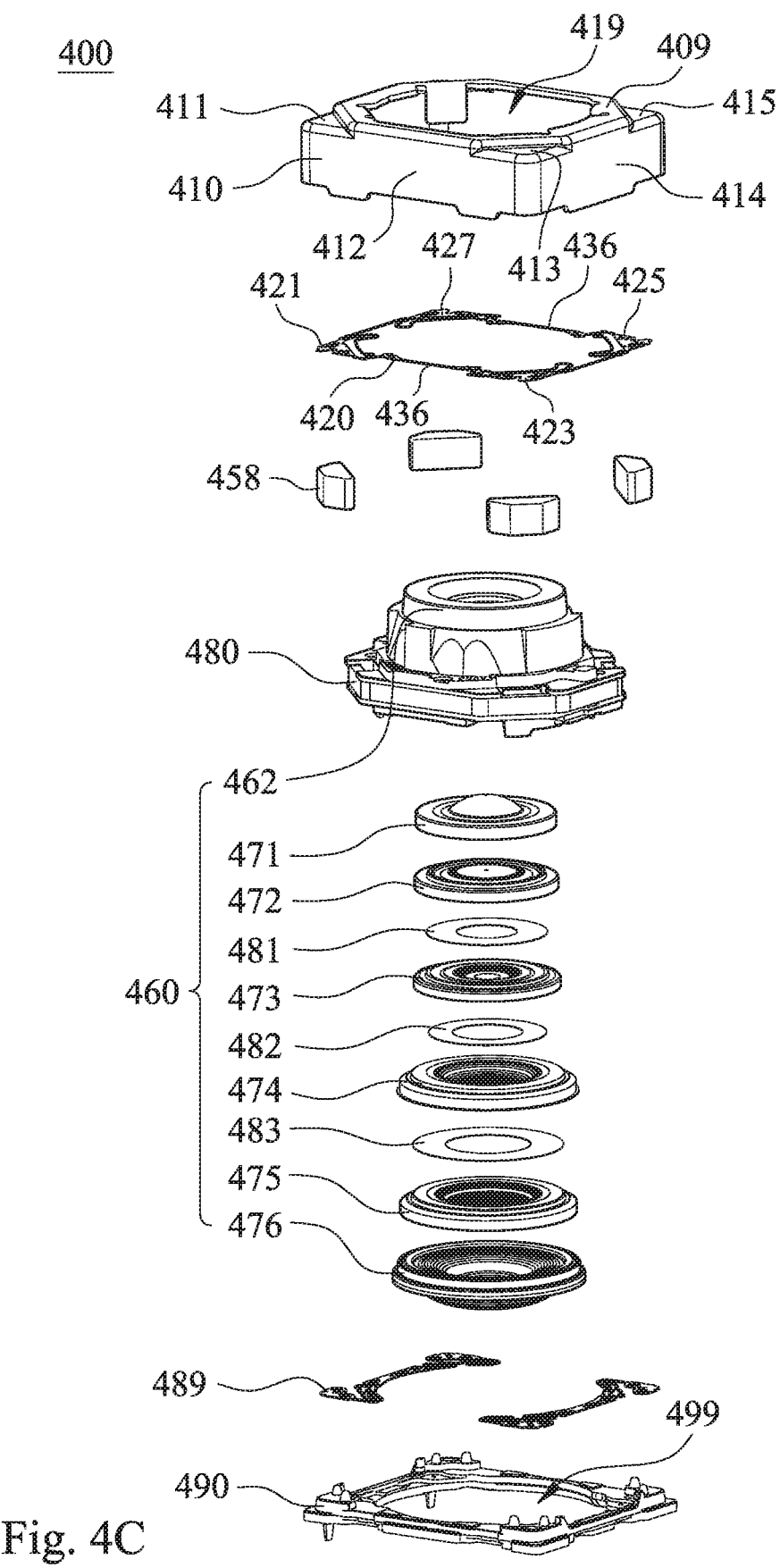
FIG. 4C is an exploded view of the photographing module according to the 4th embodiment.
Figure 4D:
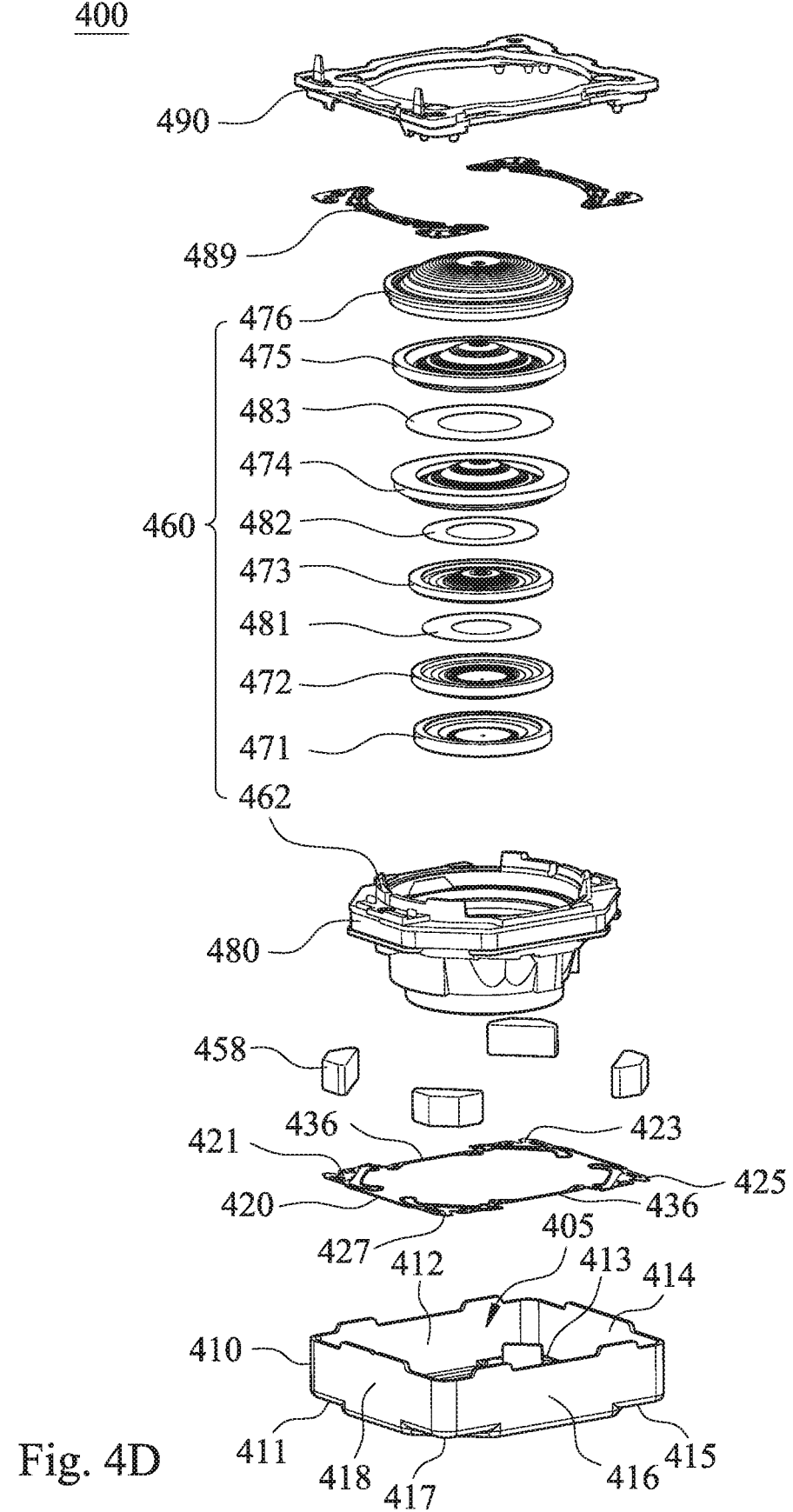
FIG. 4D is another exploded view of the photographing module according to the 4th embodiment.

FIG. 4A is a three-dimensional view of a photographing module 400 according to the 4th embodiment of the present disclosure. FIG. 4B is another three-dimensional view of the photographing module 400 according to the 4th embodiment. FIG. 4C is an exploded view of the photographing module 400 according to the 4th embodiment. FIG. 4D is another exploded view of the photographing module 400 according to the 4th embodiment. In FIG. 4A to FIG. 4D, the photographing module 400 includes a metal cover 410, a base 490, a lens portion 460 and a plurality of leaf springs. The leaf springs are an upper leaf spring 420 and two lower leaf springs 489. The upper leaf spring 420 and the two lower leaf springs 489 are all made of metal materials.

In FIG. 4A and FIG. 4B, the metal cover 410 includes a top plate 409 and four side plates, which are side plates 412, 414, 416 and 418. The top plate 409 has an opening 419. The side plates 412, 414, 416 and 418 extend from the top plate 409 along a direction away from the opening 419. The base 490 is assembled with the metal cover 410 to define an inner space 405. The base 490 has a through hole 499, and the through hole 499 is disposed correspondingly to the opening 419 of the metal cover 410. The lens portion 460 is displaceably disposed in the inner space 405.

Specifically, the photographing module 400 includes the metal cover 410, the upper leaf spring 420, driving magnets 458, the lens portion 460, a coil 480, the lower leaf springs 489 and the base 490. The upper leaf spring 420, the driving magnets 458, the lens portion 460, the coil 480 and the lower leaf springs 489 are disposed in the inner space 405.

Figure 4E:
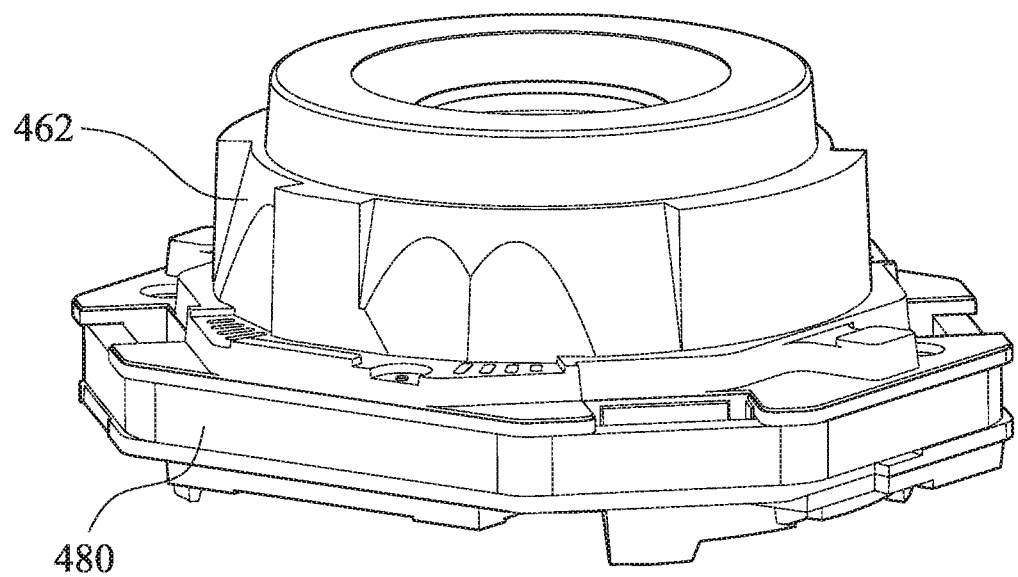
FIG. 4E is a three-dimensional view of a lens barrel according to the 4th embodiment.
Figure 4F:
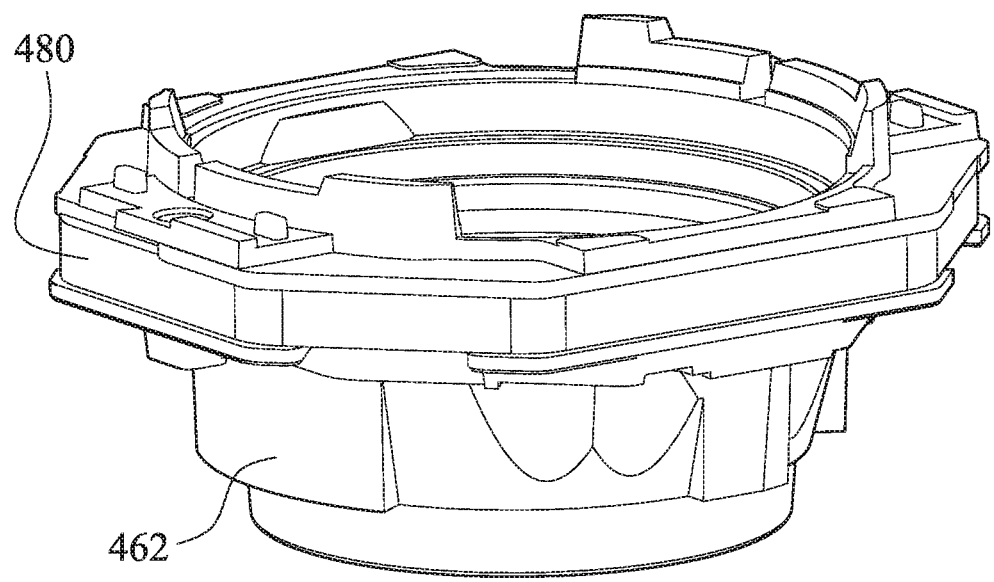
FIG. 4F is another three-dimensional view of the lens barrel according to the 4th embodiment.

FIG. 4E is a three-dimensional view of a lens barrel 462 according to the 4th embodiment. FIG. 4F is another three-dimensional view of the lens barrel 462 according to the 4th embodiment. In FIG. 4C to FIG. 4F, the lens portion 460 includes the lens barrel 462, a carrier 463 and plastic lens elements 471, 472, 473, 474, 475, 476, light blocking sheets 481, 482 and 483. The lens barrel 462 is an integrated lens barrel. The lens barrel 462 is directly assembled with the upper leaf spring 420 and directly assembled with the plastic lens elements 471, 472, 473, 474, 475, 476, the light blocking sheets 481, 482 and 483.

Comparing with the lens barrel 162 in the 1st embodiment, the lens barrel 162 is not an integrated lens barrel. That is, the plastic lens elements 171 are directly assembled with and disposed in the lens barrel 162, but the lens barrel 162 is not directly assembled with the upper leaf spring 120 and the lower leaf springs 189. The carrier 163 is assembled with the lens barrel 162, and the upper leaf spring 120 and the lower leaf springs 189 are directly assembled with the carrier 163. In the 4th embodiment, the upper leaf spring 420 and the lower leaf springs 489 are arranged along a direction parallel to an optical axis (its reference numeral is omitted) and connected to the lens barrel 462. The upper leaf spring 420 is disposed on an end surface (its reference numeral is omitted) of the lens barrel 462, which is away from the base 490. The lower leaf springs 489 are disposed on an end surface (its reference numeral is omitted) of the lens barrel 462, which is close to the base 490. Thus, the lens barrel 462 (i.e. together with the plastic lens elements 471, 472, 473, 474, 475, 476, the light blocking sheets 481, 482 and 483) is carried to be displaced relative to the base 490 and the metal cover 410 along the direction parallel to the central axis by the upper leaf spring 420 and the lower leaf springs 489, so as to achieve an auto-focusing function of the photographing module 400. Therefore, the lens barrel 462 being the integrated lens barrel is advantageous in reducing the occurrences of the upper leaf spring being twisted to be broken in a conventional technique of a lens barrel and a carrier required to be assembled, so as to directly eliminate causes of additional assembling tolerances.

Figure 4G:
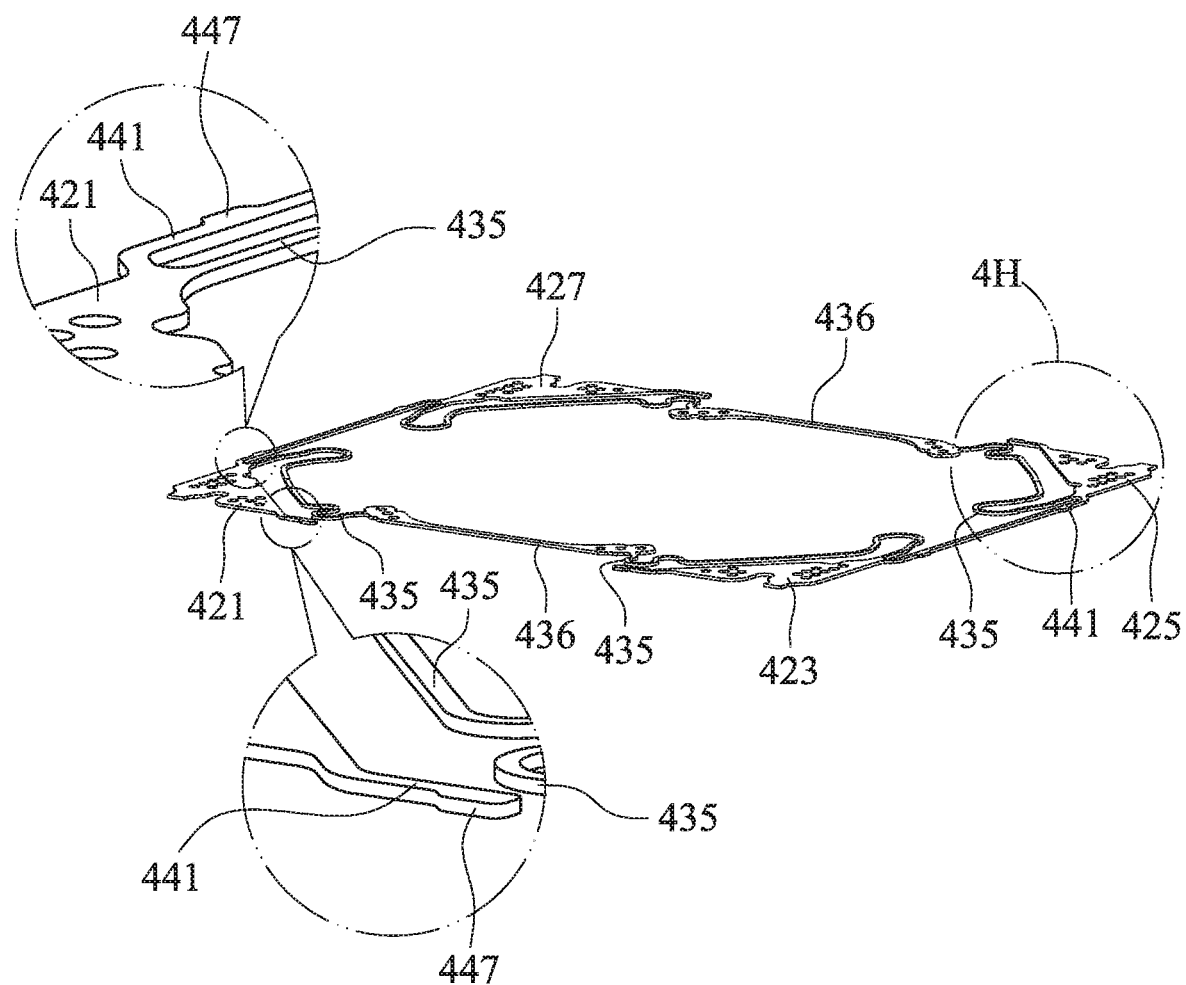
FIG. 4G is a three-dimensional view of an upper leaf spring according to the 4th embodiment.
Figure 4H:
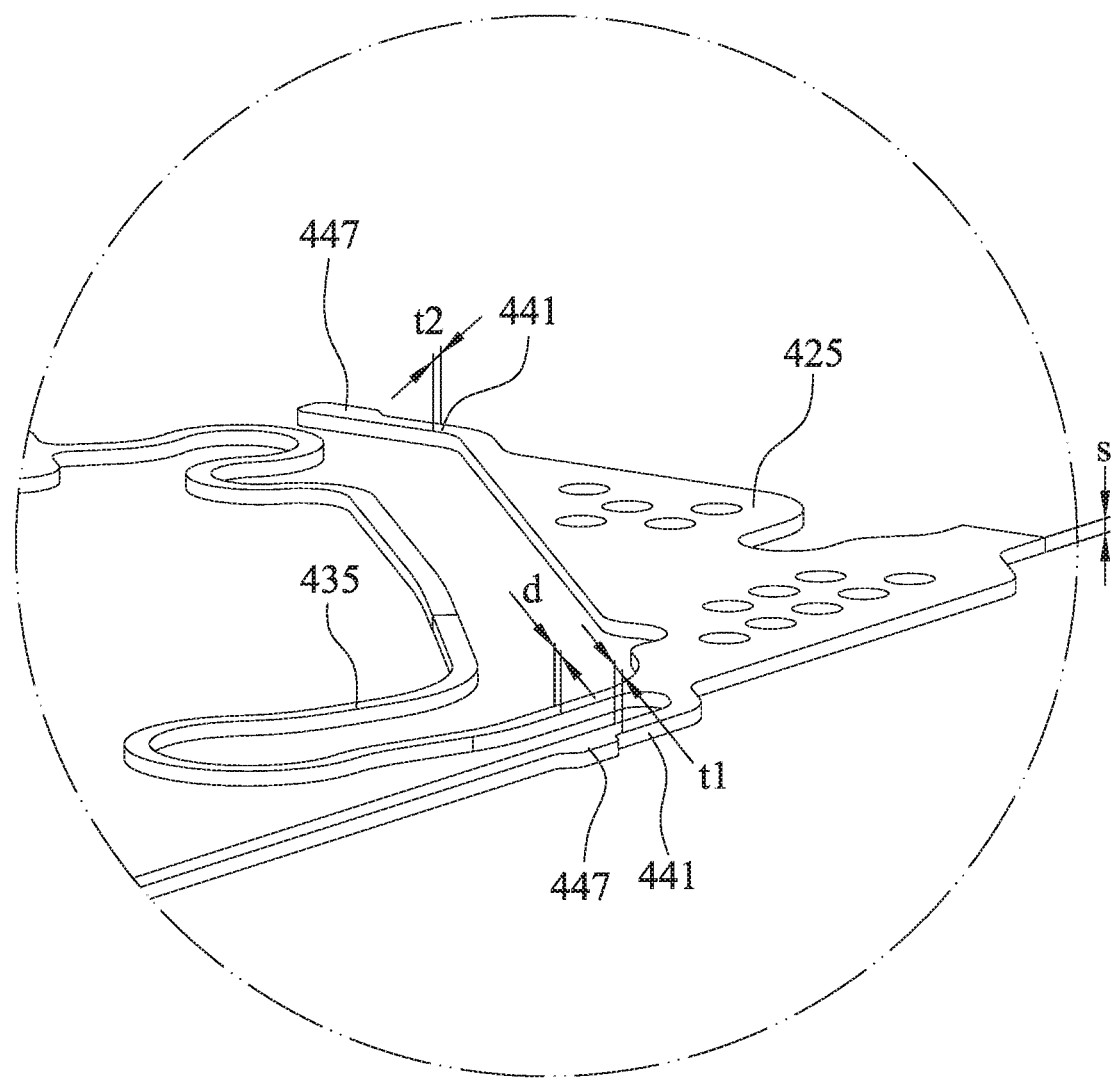
FIG. 4H is an enlarged view of part 4H in FIG. 4G.

FIG. 4G is a three-dimensional view of the upper leaf spring 420 according to the 4th embodiment. FIG. 4H is an enlarged view of part 4H in FIG. 4G. In FIG. 4C, FIG. 4D, FIG. 4G and FIG. 4H, the upper leaf spring 420 includes inner fixing portions 436, outer fixing portions 421, 423, 425, 427 and elastic portions 435. In the 4th embodiment, the upper leaf spring 420 is in a sheet shape. For the upper leaf spring 420, a number of the inner fixing portions 436 is two, a number of each of the outer fixing portions 421, 423, 425, 427 is one, and a number of the elastic portions 435 is four. The upper leaf spring 420 is assembled with the carrier 463 of the lens portion 460 via the two inner fixing portions 436 of the upper leaf spring 420. The outer fixing portions 421, 423, 425, 427 contact and are fixedly disposed with the top plate 409 of the metal cover 410.

In the 4th embodiment, one of the inner fixing portions 436 is located between the outer fixing portions 421 and 423, one of the elastic portions 435 connects the one of the inner fixing portions 436 and the outer fixing portion 421, and another of the elastic portions 435 connects the one of the inner fixing portions 436 and the outer fixing portion 423. The other one of the inner fixing portions 436 is located between the outer fixing portions 225 and 427, further another of the elastic portions 435 connects the other one of the inner fixing portions 436 and the outer fixing portion 425, and still another of the elastic portions 435 connects the other one of the inner fixing portions 436 and the outer fixing portion 427. Thus, the four elastic portions 435 connect the inner fixing portions 436 and the outer fixing portions 421, 423, 425, 427, respectively. Specifically, each of the elastic portions 435 is in a curved strip shape with a consistent width, and the four elastic portions 435 have the same widths.

The upper leaf spring 420 further includes a plurality of contact portions 447 and a plurality of auxiliary elastic portions 441. Each of the auxiliary elastic portions 441 connects one of the outer fixing portions 421, 423, 425, 427 and one of the contact portions 447. For the upper leaf spring 420, only the contact portions 447 thereof contact the side plates 412, 414, 416, 418 of the metal cover 410. Specifically, each of the auxiliary elastic portions 441 is in a straight strip shape with a consistent width or in a curved strip shape with a consistent width.

In the 4th embodiment, an appearance of the top plate 409 of the metal cover 410 is in the rectangular shape with the opening 419. The upper leaf spring 420 is disposed along inner sides of the side plates 412, 414, 416, 418 to have the rectangular shape and correspondingly to the top plate 409. The outer fixing portions 421, 423, 425, 427 of the upper leaf spring 420 are disposed correspondingly to four corners, respectively, formed by the side plates 412, 414, 416, 418.

Specifically, in FIG. 4G and FIG. 4H, each of two ends of each of the outer fixing portions 421, 423, 425, 427 is directly connected to one end of one of the auxiliary elastic portions 441, and the other end of each of the auxiliary elastic portions 441 is directly connected to one of the contact portions 447. For example, as shown in FIG. 4G, each of two ends (one end toward the outer fixing portion 427 or the side plate 418, and one end toward the outer fixing portion 421 or the side plate 412) of the outer fixing portion 421 is directly connected to one end of one of the auxiliary elastic portions 441, and the other end of each of the two auxiliary elastic portions 441 is directly connected to one of the contact portions 447. Thus, each of the auxiliary elastic portions 441 connects one of the contact portions 447 and one of the outer fixing portions 421, 423, 425, 427. A number of the auxiliary elastic portions 441 of the upper leaf spring 420 is eight, and a number of the contact portions 447 of the upper leaf spring 420 is eight.

In the 4th embodiment, each of the side plates 412, 414, 416, 418 contacts two of the contact portions 447, and the upper leaf spring 420 except the eight contact portions 447 thereof does not contact the side plates 412, 414, 416, 418 of the metal cover 410. The top plate 409 includes step-shaped structures 411, 413, 415, 417. For the metal cover 410, the outer fixing portions 421, 423, 425, 427 of the upper leaf spring 420 only respectively contact the step-shaped structures 411, 413, 415, 417 of the metal cover 410, and do not contact the side plates 412, 414, 416, 418 of the metal cover 410.

The eight auxiliary elastic portions 441 and the outer fixing portions 421, 423, 425, 427 of the upper leaf spring 420 do not overlap along a radial direction of the optical axis. Specifically, each two of the eight auxiliary elastic portions 441 are connected to two ends, which are toward adjacent two side plates, of one of the outer fixing portions 421, 423, 425, 427. Furthermore, each of the four elastic portions 435 extends and curves along a portion near the optical axis of a corresponding one of the outer fixing portions 421, 423, 425, 427 to be directly connected to the corresponding one of the outer fixing portions 421, 423, 425, 427. For example, as shown in FIG. 4H, one of the four elastic portions 435 extends and curves from an end thereof toward the side plate 416 (or the outer fixing portion 427) along a portion near the optical axis of the outer fixing portion 425 to the other end thereof toward the side plate 414 (or the outer fixing portion 423), and thereby the one of the four elastic portions 435 is directly connected to the outer fixing portion 425.

Figure 4I:
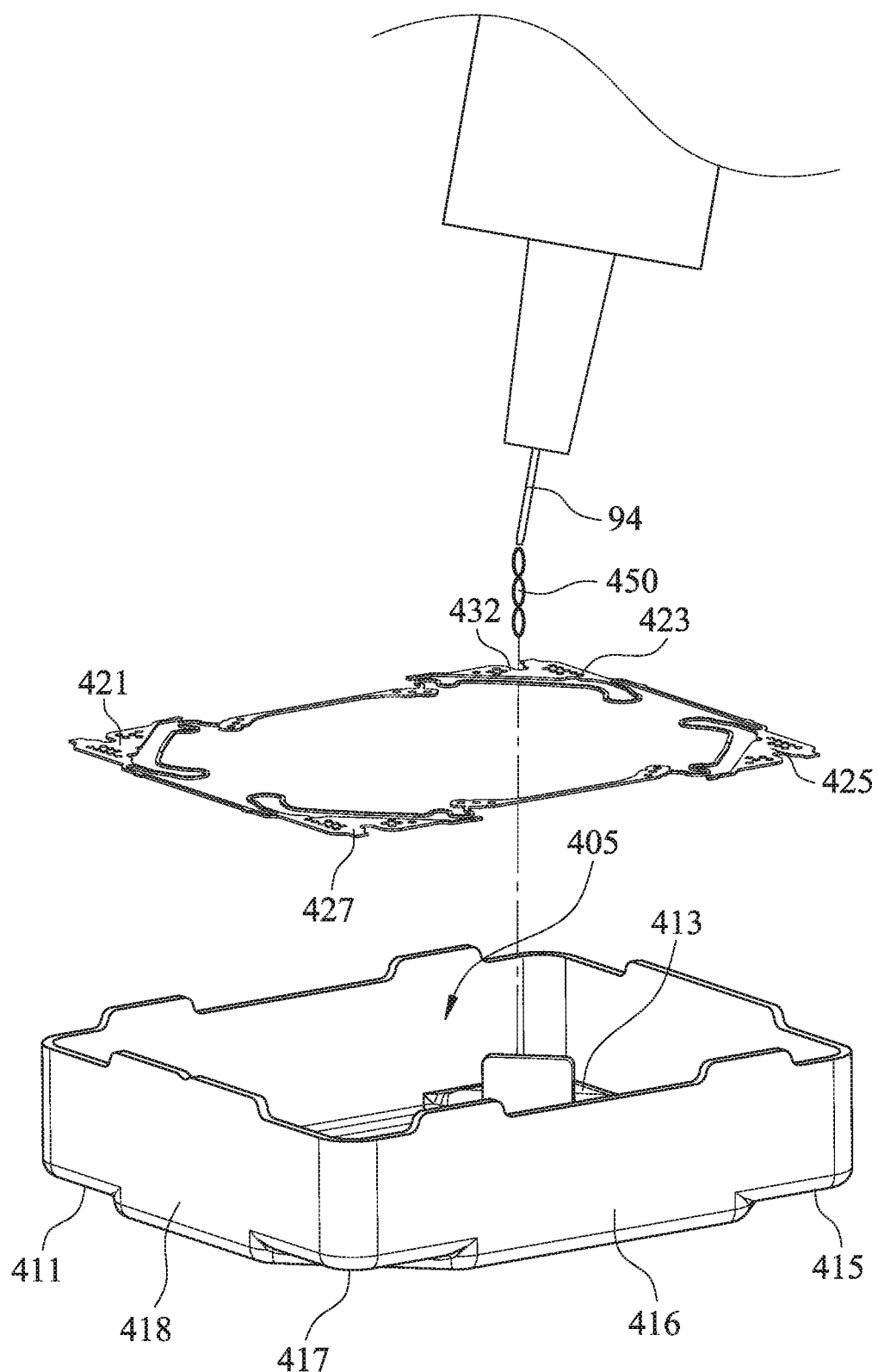
FIG. 4I is a schematic view of applying a glue material according to the 4th embodiment.

FIG. 4I is a schematic view of applying a glue material 450 according to the 4th embodiment. In FIG. 4I, the glue material 450 is applied between the outer fixing portion 421 and the step-shaped structure 411, between the outer fixing portion 423 and the step-shaped structure 413, between the outer fixing portion 425 and the step-shaped structure 415, and between the outer fixing portion 427 and the step-shaped structure 417 by a needle 94. An apparent color of the glue material 450 is opaque black. Each of the outer fixing portions 421, 423, 425, 427 includes a notch structure 432 for accommodating the glue material 450.

The data of the parameters of the photographing module 400 according to the 4th embodiment of the present disclosure are listed in the following Table 4, wherein the parameters are also shown as FIG. 4H. The definitions of these parameters shown in Table 4 are the same as those stated in the 1st embodiment with corresponding values in the 4th embodiment.

TABLE 4

| 4th Embodiment | | | |
|---|---|---|---|
| t1 (mm) | 0.05 | t1/d | 1 |
| t2 (mm) | 0.05 | t2/d | 1 |
| d (mm) | 0.05 | s (mm) | 0.03 |

5th Embodiment

Figure 5A:
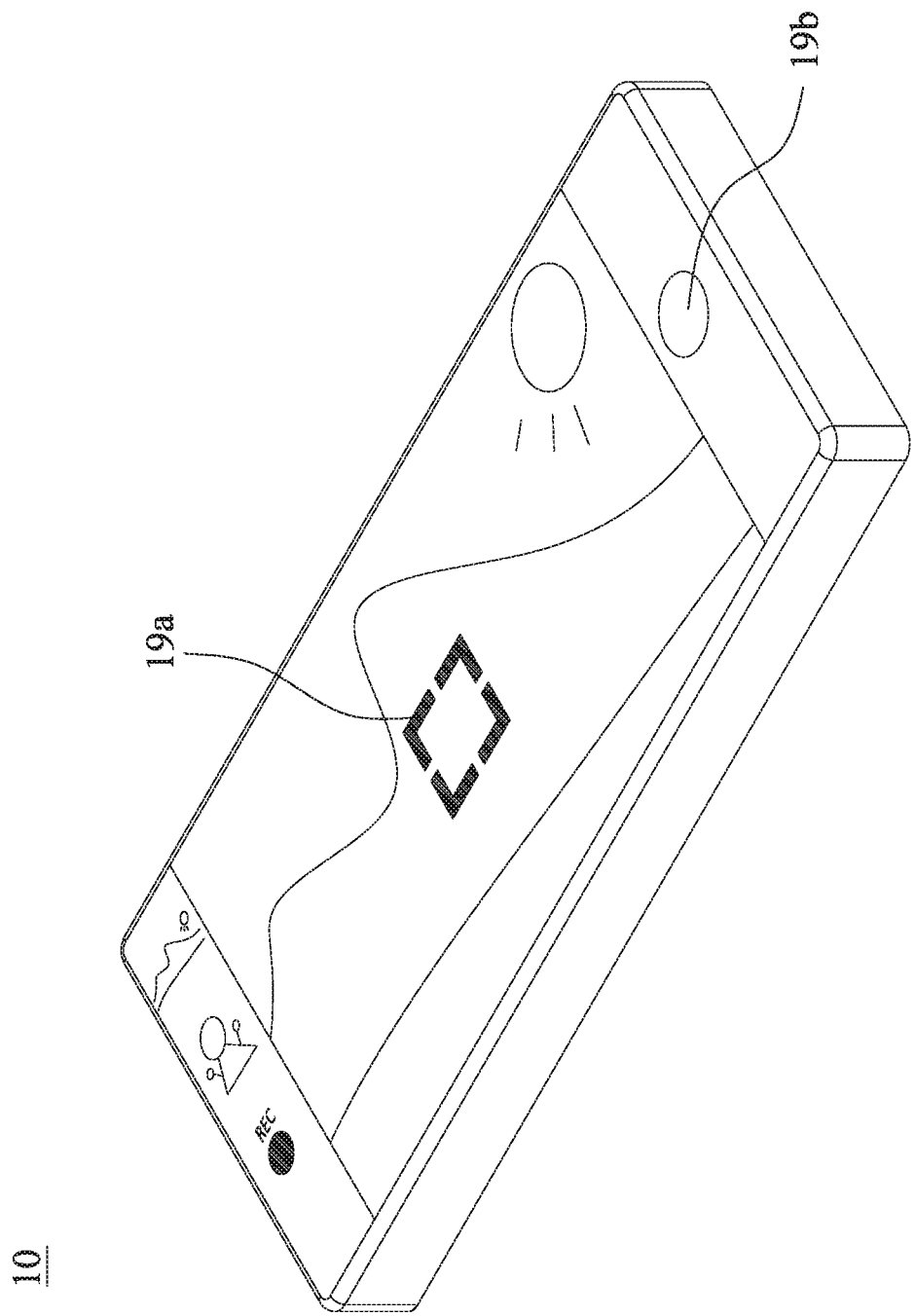
FIG. 5A shows a schematic view of an electronic device according to the 5th embodiment of the present disclosure.
Figure 5B:
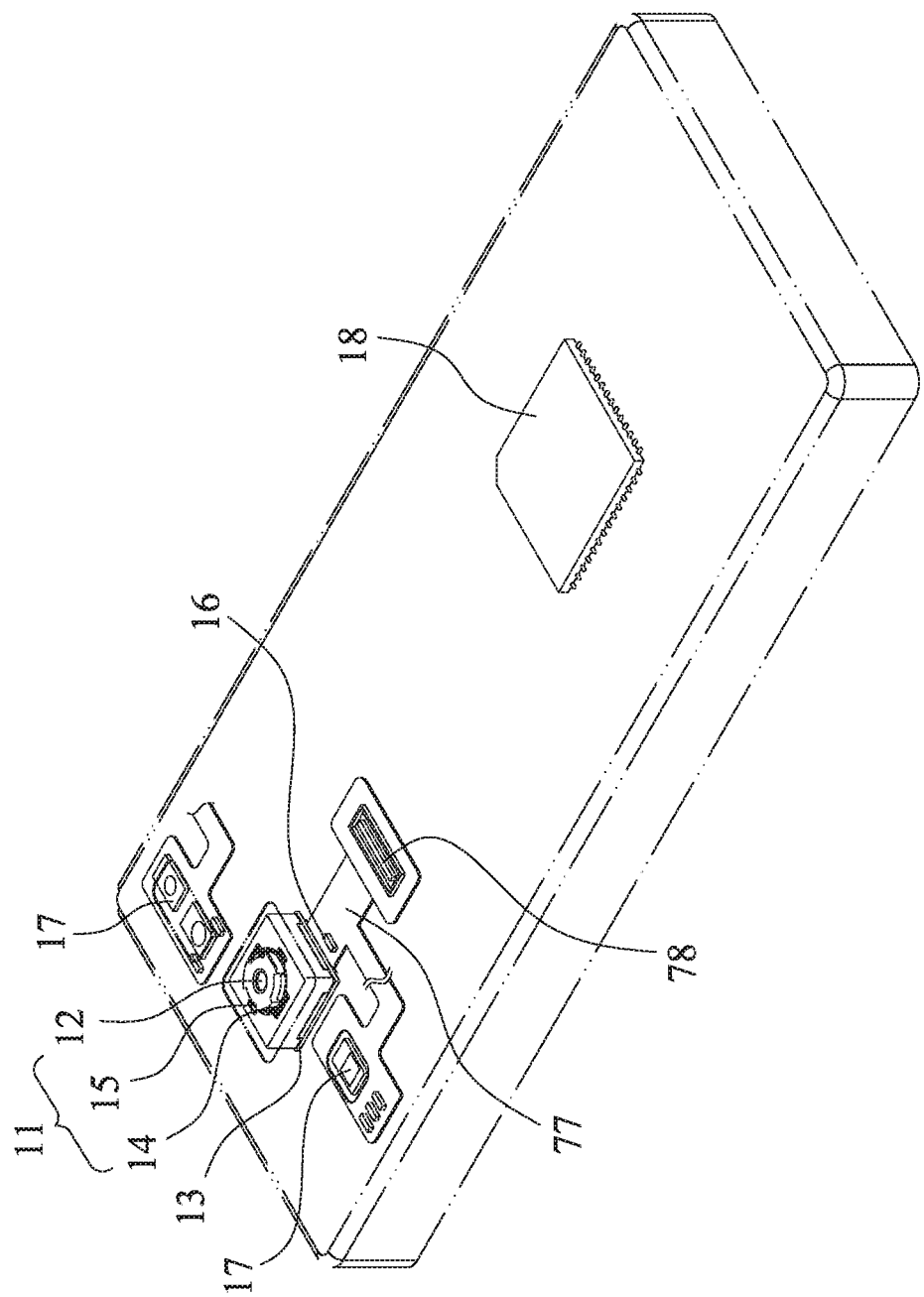
FIG. 5B shows another schematic view of the electronic device according to the 5th embodiment.

FIG. 5A shows a schematic view of an electronic device 10 according to the 5th embodiment of the present disclosure, FIG. 5B shows another schematic view of the electronic device 10 according to the 5th embodiment, and particularly, FIG. 5A and FIG. 5B are schematic views related to a camera of the electronic device 10. In FIG. 5A and FIG. 5B, the electronic device 10 of the 5th embodiment is a smart phone. The electronic device 10 includes a photographing module 11 and an image sensor 13, wherein the photographing module 11 includes a lens portion 12, and the image sensor 13 is disposed on an image surface (not shown in drawings) of the photographing module 11. Therefore, a better image quality can be achieved, and hence the high-end imaging requirements of modern electronic devices can be satisfied.

Furthermore, the user activates the capturing mode via a user interface 19 of the electronic device 10, wherein the user interface 19 of the 5th embodiment can be a touch screen 19a, a button 19b and etc. At this moment, the imaging light of the lens portion 12 is converged on the image sensor 13, and the electronic signal associated with image is output to an image signal processor (ISP) 18.

Figure 5C:
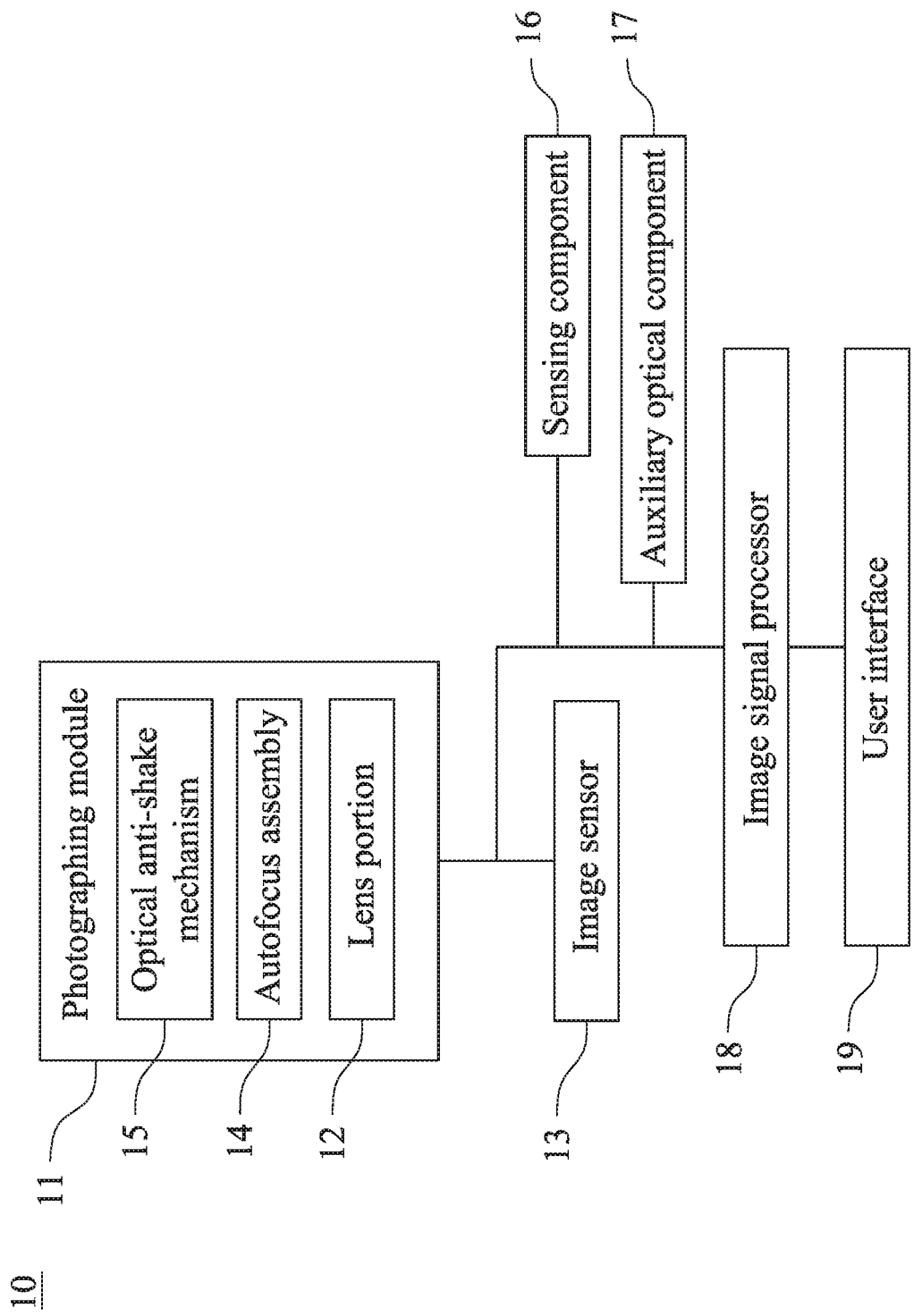
FIG. 5C shows a block diagram of the electronic device according to the 5th embodiment.

FIG. 5C shows a block diagram of the electronic device 10 according to the 5th embodiment, and in particular, the block diagram is related to the camera of the electronic device 10. In FIG. 5A to FIG. 5C, the photographing module 11 can further include an autofocus assembly 14 and an optical anti-shake mechanism 15 based on the camera specification of the electronic device 10. Moreover, the electronic device 10 can further include at least one auxiliary optical component 17 and at least one sensing component 16. The auxiliary optical component 17 can be a flash module for compensating for the color temperature, an infrared distance measurement component, a laser focus module and etc. The sensing component 16 can have functions for sensing physical momentum and kinetic energy, and thereby can be an accelerator, a gyroscope, and a Hall effect element, to sense shaking or jitters applied by hands of the user or external environments. Accordingly, the functions of the autofocus assembly 14 and the optical anti-shake mechanism 15 of the photographing module 11 can be aided and enhanced to achieve the superior image quality. Furthermore, the electronic device 10 according to the present disclosure can have a capturing function with multiple modes, such as taking optimized selfies, high dynamic range (HDR) under a low light condition, 4K resolution recording, etc. Additionally, the user can visually see the captured image of the camera through the touch screen 19a and manually operate the view finding range on the touch screen 19a to achieve the auto focus function of what you see is what you get.

Furthermore, in FIG. 5B, the photographing module 11, the sensing component 16 and the auxiliary optical component 17 can be disposed on a flexible printed circuit board (FPC) 77 and electrically connected with the associated components, such as the imaging signal processor 18, via a connector 78 to perform a capturing process. Since the current electronic devices, such as smart phones, have a tendency of being compact, the way of firstly disposing the photographing module and related components on the flexible printed circuit board and secondly integrating the circuit thereof into the main board of the electronic device via the connector can satisfy the requirements of the mechanical design and the circuit layout of the limited space inside the electronic device, and obtain more margins. The autofocus function of the photographing module can also be controlled more flexibly via the touch screen of the electronic device. In the 5th embodiment, the electronic device 10 includes a plurality of sensing components 16 and a plurality of auxiliary optical components 17. The sensing components 16 and the auxiliary optical components 17 are disposed on the flexible printed circuit board 77 and at least one other flexible printed circuit board (its reference numeral is omitted) and electrically connected with the associated components, such as the image signal processor 18, via corresponding connectors to perform the capturing process. In other embodiments (not shown herein), the sensing components and the auxiliary optical components can also be disposed on the main board of the electronic device or carrier boards of other types according to requirements of the mechanical design and the circuit layout.

In addition, the electronic device 10 can further include but not be limited to a wireless communication unit, a control unit, a storage unit, a random access memory, a read-only memory, or a combination thereof.

6th Embodiment

Figure 6:
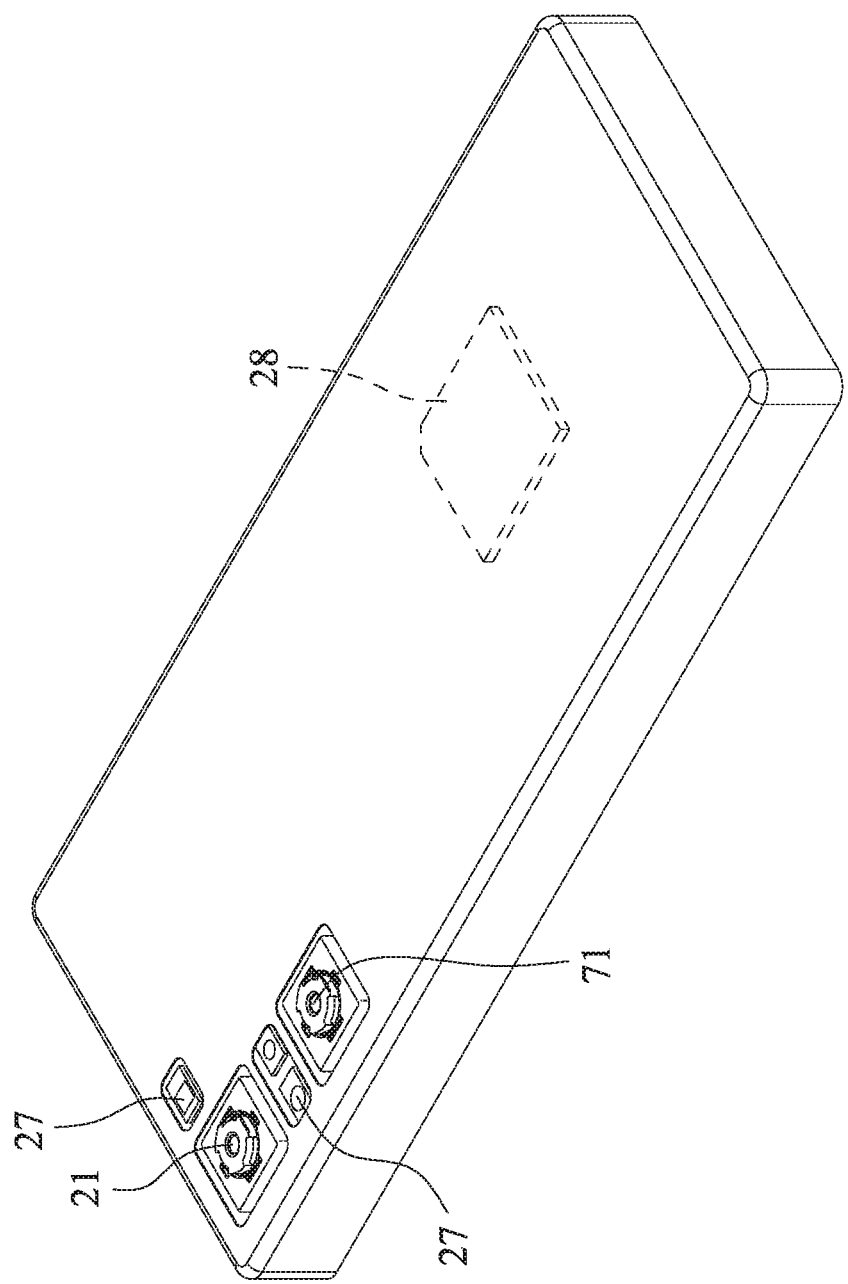
FIG. 6 shows an electronic device according to the 6th embodiment of the present disclosure.

FIG. 6 shows an electronic device 20 according to the 6th embodiment of the present disclosure. In FIG. 6, the electronic device 20 of the 6th embodiment is a smart phone. The electronic device 20 includes photographing modules 21, 71 and two image sensors (not shown in drawings) respectively corresponding to thereof. The two image sensors are respectively disposed on an image surface of the photographing module 21 and an image surface of the photographing module 71.

Furthermore, at least one of the photographing modules 21 and 71 is a photographing module according to the present disclosure, and the photographing modules 21 and 71 may not have the same optical properties. In the photographing procedure of the electronic device 20, two images can be captured by the photographing modules 21 and 71 with an aid of an auxiliary optical component 27, and then the required effects like zooming, delicate images would be achieved by the processors (such as an image signal processor 28 and so on) equipped in the electronic device 20.

7th Embodiment

Figure 7:
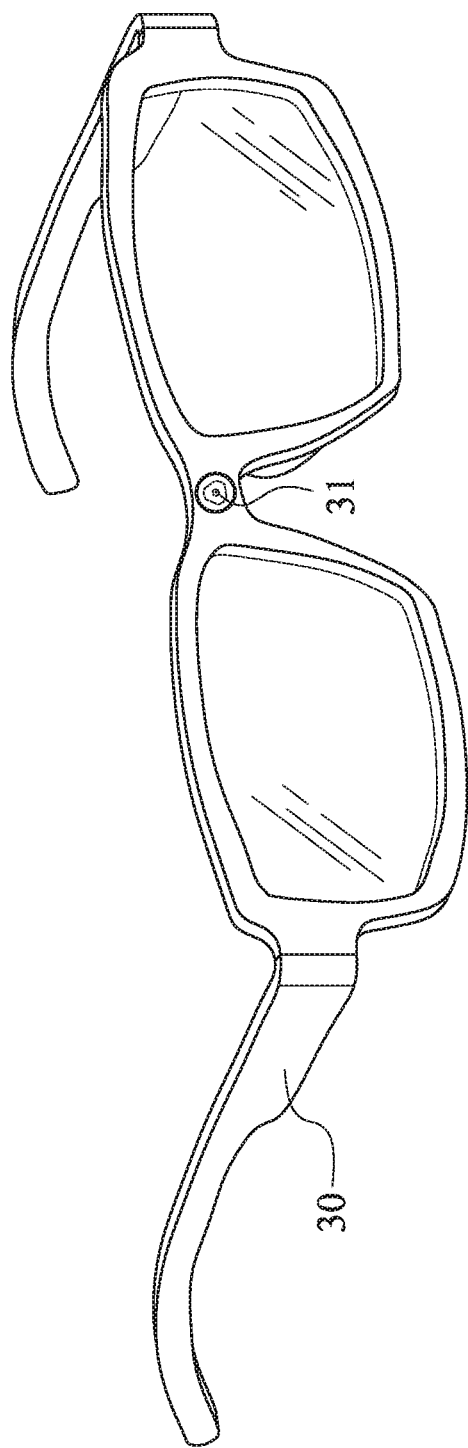
FIG. 7 shows an electronic device according to the 7th embodiment of the present disclosure.

FIG. 7 shows an electronic device 30 according to the 7th embodiment of the present disclosure. The electronic device 30 of the 7th embodiment is a wearable device. The electronic device 30 includes a photographing module 31 and an image sensor (not shown in drawings), and the image sensor is disposed on an image surface of the photographing module 31.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing module, comprising:
a metal cover comprising a top plate and a plurality of side plates, wherein the top plate has an opening, and the side plates extend from the top plate along a direction away from the opening;
a base assembled with the metal cover to define an inner space, wherein the base has a through hole, and the through hole is disposed correspondingly to the opening of the metal cover;
a lens portion displaceably disposed in the inner space; and
a leaf spring assembled with the lens portion and comprising an inner fixing portion, an outer fixing portion and an elastic portion, wherein the inner fixing portion is assembled with the lens portion, the outer fixing portion contacts and is fixedly disposed with the metal cover, and the elastic portion connects the inner fixing portion and the outer fixing portion;
wherein the leaf spring further comprises a plurality of contact portions and a plurality of auxiliary elastic portions, each of the auxiliary elastic portions connects the outer fixing portion and one of the contact portions, and for the leaf spring, only the contact portions thereof contact the side plates of the metal cover.

2. The photographing module of claim 1, wherein a number of the outer fixing portion of the leaf spring is at least two.

3. The photographing module of claim 2, wherein at least one of the outer fixing portions is connected to at least two of the auxiliary elastic portions, and each of the at least two of the auxiliary elastic portions is connected to one of the contact portions.

4. The photographing module of claim 3, wherein a number of the side plates is at least four, and each of the side plates contacts at least one of the contact portions.

5. The photographing module of claim 2, wherein the top plate comprises at least two step-shaped structures, and for the metal cover, each of the outer fixing portions contacts only one of the step-shaped structures thereof;
wherein each of the outer fixing portions does not contact the side plates.

6. The photographing module of claim 5, wherein the auxiliary elastic portions and the outer fixing portions of the leaf spring do not overlap along a radial direction of an optical axis.

7. The photographing module of claim 5, further comprising:
a glue material applied between the outer fixing portions and the step-shaped structures.

8. The photographing module of claim 7, wherein an apparent color of the glue material is opaque black.

9. The photographing module of claim 7, wherein each of the outer fixing portions comprises a notch structure for accommodating the glue material.

10. The photographing module of claim 1, wherein a width of one of the auxiliary elastic portions is t, a width of the elastic portion is d, and the following condition is satisfied:

$$0.25 < t/d < 4.0.$$

11. The photographing module of claim 10, wherein the width of the one of the auxiliary elastic portions is t, the width of the elastic portion is d, and the following condition is satisfied:

$$0.5 < t/d < 2.0.$$

12. The photographing module of claim 1, wherein a number of the contact portions is N, and the following condition is satisfied:

$$4 < N < 12.$$

13. The photographing module of claim 12, wherein the number of the contact portions is N, and the following condition is satisfied:

$$6 < N < 10.$$

14. The photographing module of claim 9, wherein a spacing structure is located between two of the auxiliary elastic portions, and the spacing structure and the two of the auxiliary elastic portions overlap along a radial direction of an optical axis.

15. The photographing module of claim 10, wherein a thickness of the leaf spring is greater than a width of one of the auxiliary elastic portions.

16. The photographing module of claim 1, wherein the lens portion comprises a lens barrel and a plurality of plastic lens elements, the lens barrel is an integrated lens barrel, and the lens barrel is directly assembled with the leaf spring and the plastic lens elements.

17. An electronic device, comprising:
the photographing module of claim 1; and
an image sensor, wherein the image sensor is disposed on an image surface of the photographing module.

* * * * *